United States Patent
Lim et al.

(10) Patent No.: US 11,342,981 B2
(45) Date of Patent: May 24, 2022

(54) ELECTRONIC DEVICE INCLUDING ANTENNA MODULE

(71) Applicant: Samsung Electronics Co., Ltd., Suwon-si (KR)

(72) Inventors: Byungman Lim, Suwon-si (KR); Dongyeon Kim, Suwon-si (KR); Sehyun Park, Suwon-si (KR); Sumin Yun, Suwon-si (KR); Yoonjae Lee, Suwon-si (KR); Youngjun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 332 days.

(21) Appl. No.: 16/564,256

(22) Filed: Sep. 9, 2019

(65) Prior Publication Data

US 2020/0083948 A1     Mar. 12, 2020

(30) Foreign Application Priority Data

Sep. 10, 2018    (KR) ........................ 10-2018-0107590

(51) Int. Cl.
    *H01Q 21/06*     (2006.01)
    *H04B 7/08*     (2006.01)
    *H01Q 1/24*     (2006.01)

(52) U.S. Cl.
    CPC ........... *H04B 7/0814* (2013.01); *H01Q 1/243* (2013.01); *H01Q 21/061* (2013.01)

(58) Field of Classification Search
    CPC ..... H04B 1/40; H04B 7/0814; H04M 1/0277; H04M 1/0249; H01Q 21/065;

(Continued)

(56) References Cited

U.S. PATENT DOCUMENTS

| 6,100,843 A | 8/2000 | Proctor, Jr. et al. |
| 6,304,215 B1 | 10/2001 | Proctor, Jr. et al. |

(Continued)

FOREIGN PATENT DOCUMENTS

| KR | 10-2014-0090423 A | 7/2014 |
| KR | 10-2017-0115870 A | 10/2017 |
| KR | 10-2018-0039425 A | 4/2018 |

OTHER PUBLICATIONS

International Search Report dated Jan. 3, 2020, issued in International Application No. PCT/KR2019/011631.

(Continued)

*Primary Examiner* — Alexander H Taningco
*Assistant Examiner* — Amy X Yang
(74) *Attorney, Agent, or Firm* — Jefferson IP Law, LLP

(57) ABSTRACT

An electronic device is provided. The electronic device includes a housing, an antenna structure including a printed circuit board, a first sub antenna structure including first group antenna elements, a second sub antenna structure including second group antenna elements disposed in a first direction from the first sub antenna structure, a third sub antenna structure including third group antenna elements disposed in a second direction perpendicular to the first direction, and a fourth sub antenna structure including fourth group antenna elements disposed to form a two-dimensional array together with at least some antenna elements of the first group antenna elements, the second group antenna elements, or the third group antenna elements, and a communication circuit that transmits and/or receives a signal having a frequency between 3 GHz and 100 GHz by using at least a part of the first, the second, the third, or the fourth group antenna elements.

19 Claims, 17 Drawing Sheets

(58) Field of Classification Search
CPC ........ H01Q 21/28; H01Q 9/0407; H01Q 1/38; H01Q 9/065; H01Q 21/062; H01Q 25/00; H01Q 21/08; H01Q 1/243; H01Q 21/061
USPC ........................................................ 343/702
See application file for complete search history.

(56) References Cited

U.S. PATENT DOCUMENTS

| | | |
|---|---|---|
| 6,400,317 B2 | 6/2002 | Rouphael et al. |
| 6,404,386 B1 | 6/2002 | Proctor, Jr. et al. |
| 6,473,036 B2 | 10/2002 | Proctor, Jr. |
| 6,518,920 B2 | 2/2003 | Proctor, Jr. et al. |
| 6,600,456 B2 | 7/2003 | Gothard et al. |
| 6,792,290 B2 | 9/2004 | Proctor, Jr. et al. |
| 6,933,887 B2 | 8/2005 | Regnier et al. |
| 6,989,797 B2 | 1/2006 | Gothard et al. |
| 7,009,559 B2 | 3/2006 | Regnier et al. |
| 7,215,297 B2 | 5/2007 | Gothard et al. |
| 7,289,827 B2 | 10/2007 | Proctor, Jr. et al. |
| 7,528,789 B2 | 5/2009 | Gothard et al. |
| 7,737,891 B2 | 6/2010 | Yong et al. |
| 9,270,357 B2 | 2/2016 | Kim |
| 10,236,560 B2 | 3/2019 | Shin et al. |
| 10,305,172 B2 | 5/2019 | Noori et al. |
| 10,680,663 B2 | 6/2020 | Ouyang et al. |
| 10,998,616 B2 | 5/2021 | Mow et al. |
| 11,025,285 B2 | 6/2021 | Ouyang et al. |
| 2002/0008672 A1 | 1/2002 | Gothard et al. |
| 2008/0158054 A1* | 7/2008 | Yong ................. H01Q 3/28 342/374 |
| 2012/0032865 A1* | 2/2012 | Toyao ............... H01Q 15/14 343/835 |
| 2012/0274531 A1* | 11/2012 | Harper ............. H01Q 9/285 343/798 |
| 2013/0156080 A1* | 6/2013 | Cheng ............... H01Q 1/243 375/222 |
| 2014/0192927 A1* | 7/2014 | Kim ................. H04B 7/0689 375/299 |
| 2016/0365909 A1* | 12/2016 | Kim ................. H03F 3/195 |
| 2017/0290011 A1 | 10/2017 | Kushnir et al. |
| 2017/0302306 A1 | 10/2017 | Ouyang et al. |
| 2017/0309992 A1 | 10/2017 | Noori et al. |
| 2018/0090816 A1 | 3/2018 | Mow et al. |
| 2021/0218158 A1* | 7/2021 | Kim ................. H01Q 21/28 |

OTHER PUBLICATIONS

European Search Report dated Aug. 2, 2021, issued in European Application No. 19860503.2.

* cited by examiner

ELECTRONIC DEVICE INCLUDING ANTENNA MODULE

CROSS-REFERENCE TO RELATED APPLICATION(S)

This application is based on and claims priority under 35 U.S.C. § 119(a) of a Korean patent application number 10-2018-0107590, filed on Sep. 10, 2018, in the Korean Intellectual Property Office, the disclosure of which is incorporated by reference herein in its entirety.

BACKGROUND

1. Field

The disclosure relates to an electronic device including an antenna module.

2. Description of Related Art

With the development of information technology (IT), various types of electronic devices such as a smartphone, a tablet personal computer (PC), and the like are being widely used. An electronic device may perform wireless communication with any other electronic device or a base station by using an antenna module.

As the network traffic of electronic devices increases, a 5th generation (5G) mobile communication technology using a signal in a high frequency band (e.g., approximately 3 GHz or higher) is being developed. The electronic device may include an antenna module for transmitting or receiving a signal in the high frequency band. The use of the signal in the high frequency band allows a wavelength of the signal to become short (e.g., in units of millimeters) and makes it possible to use a bandwidth more widely. This means that a large amount of information may be transmitted or received.

The signal in the high frequency band may have strong straightness. The electronic device may use a beamforming technology through an array antenna for the purpose of transmitting or receiving a signal having the strong straightness. The beamforming technology may be understood as a technology for forming a beam in a specified direction and communicating with a base station or any other electronic device placed in the specified direction by using the formed beam.

The above information is presented as background information only to assist with an understanding of the disclosure. No determination has been made, and no assertion is made, as to whether any of the above might be applicable as prior art with regard to the disclosure.

SUMMARY

An electronic device may be required to provide a user with communication performance of a specified level or higher in various usage environments. For example, the electronic device may need to maintain the communication performance at the specified level or higher regardless of a posture of the electronic device, a grip type of the user, or a direction of a base station (or an external electronic device). However, because a signal in the high frequency band has the strong straightness as described above, the electronic device may require a plurality of antenna modules configured to form beams in different directions.

As the miniaturization of the electronic device is desired, a mounting space in the electronic device may be limited. The mounting of the plurality of antenna modules may cause a decrease in efficiency of an inner space of the electronic device.

Aspects of the disclosure are to address at least the above-mentioned problems and/or disadvantages and to provide at least the advantages described below. Accordingly, an aspect of the disclosure is to provide an electronic device that transmits and/or receives a signal by using at least a part of a plurality of antenna elements included in an antenna structure.

Additional aspects will be set forth in part in the description which follows and, in part, will be apparent from the description, or may be learned by practice of the presented embodiments.

In accordance with an aspect of the disclosure, an electronic device is provided. The electronic device includes a housing, an antenna structure that is disposed in the housing, wherein the antenna structure includes a printed circuit board (PCB), a first sub antenna structure including first group antenna elements disposed on the printed circuit board, a second sub antenna structure including second group antenna elements disposed on the printed circuit board in a first direction from the first sub antenna structure, a third sub antenna structure including third group antenna elements disposed on the printed circuit board in a second direction perpendicular to the first direction from the first sub antenna structure, and a fourth sub antenna structure including fourth group antenna elements disposed on the printed circuit board so as to form a two-dimensional array together with at least some antenna elements of the first group antenna elements, at least some antenna elements of the second group antenna elements, or at least some antenna elements of the third group antenna elements, and a communication circuit that transmits and/or receives a signal having a frequency between 3 GHz and 100 GHz by using at least a part of the first group antenna elements, the second group antenna elements, the third group antenna elements, or the fourth group antenna elements.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
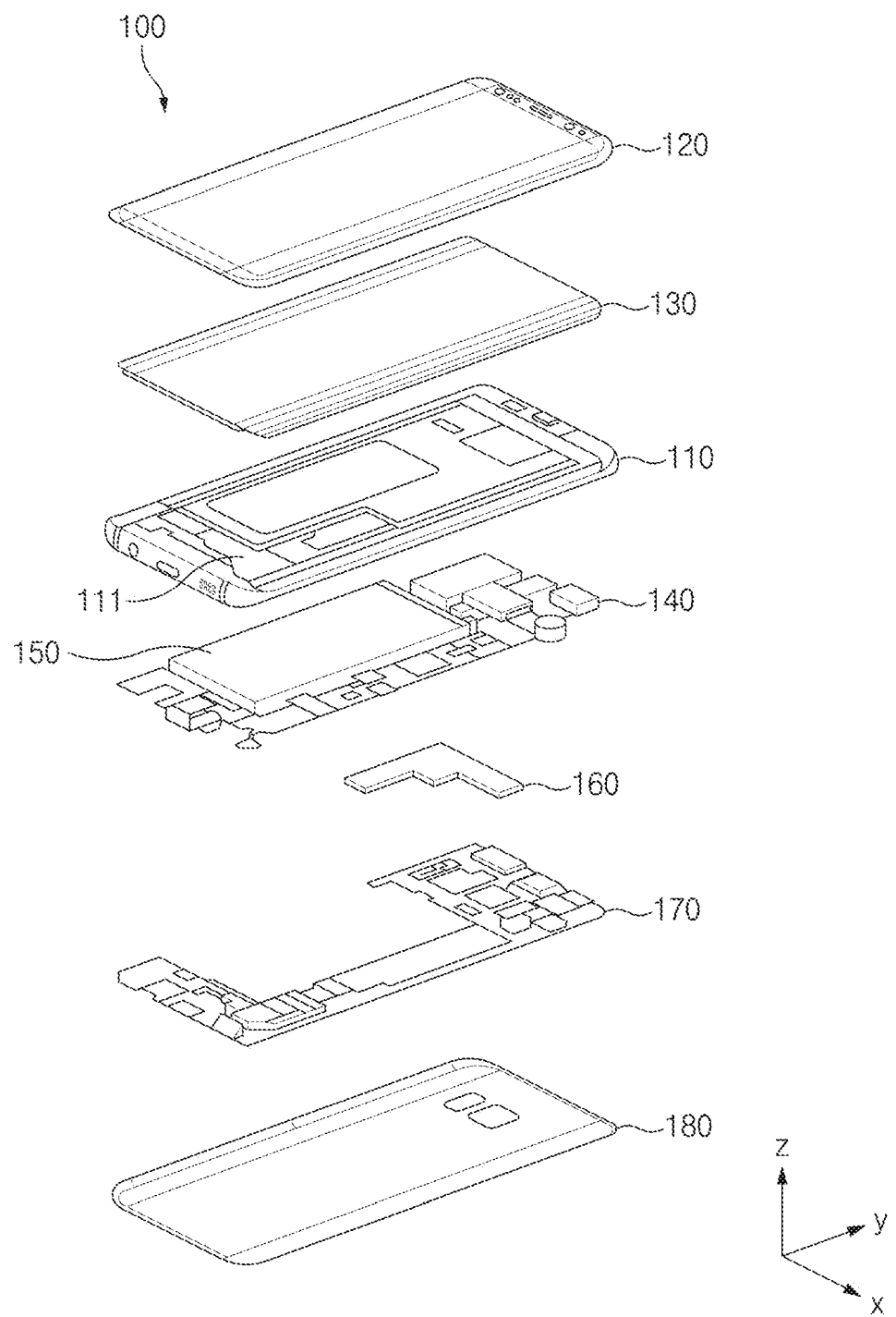
FIG. 1 is an exploded perspective view of an electronic device, according to an embodiment of the disclosure.

FIG. 1 is an exploded perspective view of an electronic device, according to an embodiment of the disclosure.

Referring to FIG. 1, an electronic device 100 may include a side bezel structure 110, a first support member 111 (e.g., a bracket), a front plate 120, a display 130, a printed circuit board (PCB) 140, a battery 150, an antenna module 160, a second support member 170 (e.g., a rear case), and a back plate 180. In an embodiment, the electronic device 100 may not include a part (e.g., the first support member 111 or the second support member 170) of the components illustrated in FIG. 1 or may further include another component not illustrated in FIG. 1.

The side bezel structure 110 may be combined with the front plate 120 and the back plate 180 to form a housing of the electronic device 100. The housing may form the exterior of the electronic device 100 and may protect components disposed in the electronic device 100 against an external environment (e.g., moisture, impact, or the like).

In an embodiment, the side bezel structure 110 may form a side surface of the housing together with a portion of the front plate 120 and/or a portion of the back plate 180. The side surface may be understood as a region that surrounds a space between a first surface on which the front plate 120 is disposed and a second surface on which the back plate 180 is disposed. In an embodiment, the side surface of the housing may be formed of a shape having four corners to be the same as or similar to substantially a quadrangle, for example, a rectangle or a rounded rectangle. In the following description, the front plate 120 may be referred to as a "first plate", and the back plate 180 may be referred to as a "second plate".

The first support member 111 may be disposed in the electronic device 100, and may be connected with the side bezel structure 110 or may be integrally formed with the side bezel structure 110. In an embodiment, the first support member 111 may support or fix electronic components disposed in the electronic device 100, for example, the printed circuit board 140, electronic components disposed on the printed circuit board 140, or various kinds of modules (e.g., the antenna module 160) performing various functions, at a direction of the front plate 120.

The front plate 120 may be combined with the side bezel structure 110 and the back plate 180 to form the housing. In an embodiment, the front plate 120 may protect an internal component of the electronic device 100, for example, the display 130, against an impact coming from a front surface of the electronic device 100. According to an embodiment, the front plate 120 may transmit a light generated from the display 130 or a light incident onto various kinds of sensors (e.g., an image sensor, an iris sensor, a proximity sensor, or the like) disposed on the front surface of the electronic device 100.

The display 130 may be disposed adjacent to one surface of the front plate 120. According to an embodiment, the display 130 may be electrically connected with the printed circuit board 140 to output content (e.g., a text, an image, a video, an icon, a widget, a symbol, or the like) or to receive a touch input (e.g., a touch, a gesture, a hovering, or the like) from the user.

Various electronic components, various elements, or various printed circuits of the electronic device 100 may be mounted on the printed circuit board 140. For example, an application processor (AP), a communication processor (CP), or an intermediate frequency integrated circuit (IF IC) may be mounted on the printed circuit board 140. In the disclosure, the printed circuit board 140 may be referred to as a "first PCB", a "main PCB", a "main board", or a "printed board assembly (PBA)".

The battery 150 may convert chemical energy and electrical energy bidirectionally. For example, the battery 150 may convert chemical energy into electrical energy and may supply the converted electrical energy to the display 130 and various components or modules mounted on the printed circuit board 140. According to an embodiment, a power management module for managing the charging and discharging of the battery 150 may be included in the printed circuit board 140.

The antenna module 160 may be a module for communicating with a base station or any other electronic device by using a millimeter wave signal. In the disclosure, the millimeter wave signal may be understood, for example, as a radio frequency (RF) signal having a frequency band ranging from 3 GHz to 100 GHz. In the following description, the antenna module 160 may be referred to as an "antenna structure" or a "communication device".

According to an embodiment, the antenna module 160 may include a plurality of antenna elements. In an embodiment, at least a part of the plurality of antenna elements may form an array antenna. For example, at least a part of the plurality of antenna elements may be arranged in a line to form an array antenna of a 1×n (or n×1) matrix. For another example, at least a part of the plurality of antenna elements may be arranged in the shape of a quadrangle to form an array antenna of an n×m matrix. According to an embodiment, the antenna module 160 may include a plurality of array antennas forming beams in different directions, and the plurality of array antennas may share at least one antenna element. Because the at least one antenna element is shared by the plurality of array antennas, the size of the antenna module 160 may decrease.

According to an embodiment, each of the formed array antennas may form at least one beam for transmitting or receiving a millimeter wave signal. According to an embodiment, a shape of the at least one beam thus formed may vary depending on an array antenna. For example, the at least one beam thus formed may have a different direction or size based on a kind of antenna elements included in an array antenna, a shape in which the antenna elements are arranged, or a direction in which the antenna elements are arranged. The electronic device 100 may perform millimeter wave communication with base stations or other electronic devices placed in various directions around the electronic device 100 by using the at least one beam formed in the different direction or size.

According to an embodiment, the antenna module 160 may be disposed adjacent to a periphery of the electronic device 100, for example, at least a portion of the side surface of the housing. For example, in the case where the housing is formed in the shape of a quadrangle or substantially a quadrangle as illustrated in FIG. 1, the antenna module 160 may be disposed adjacent to one corner of the side surface of the housing.

According to an embodiment, the electronic device 100 may include two or more antenna modules 160, unlike the example illustrated in FIG. 1. For example, the electronic device 100 may include a first antenna module and a second antenna module. In an embodiment, the first antenna module may be disposed adjacent to a first corner of the side surface, and the second antenna module may be disposed adjacent to a second corner that is different from the first corner.

According to an embodiment, a location where the antenna module 160 is disposed is not limited to FIG. 1. For example, the antenna module 160 may be interposed between the printed circuit board 140 and the second support member 170 as illustrated in FIG. 1 or may be interposed between the second support member 170 and the back plate 180, unlike the example illustrated in FIG. 1. For another example, the antenna module 160 may be disposed in the same plane as the second support member 170.

The second support member 170 may be interposed between the back plate 180 and the printed circuit board 140. According to an embodiment, similar to the first support member 111, the second support member 170 may support or fix the electronic components in the electronic device 100, at a direction of the back plate 180.

The back plate 180 may be combined with the side bezel structure 110 and the front plate 120 to form the housing. In an embodiment, the back plate 180 may protect internal components of the electronic device 100 against impact coming from a back surface of the electronic device 100.

In the following disclosure, the description of components illustrated in FIG. 1 may be identically applied to components having the same reference numerals/marks as the components of the electronic device 100 described with reference to FIG. 1.

Figure 2:
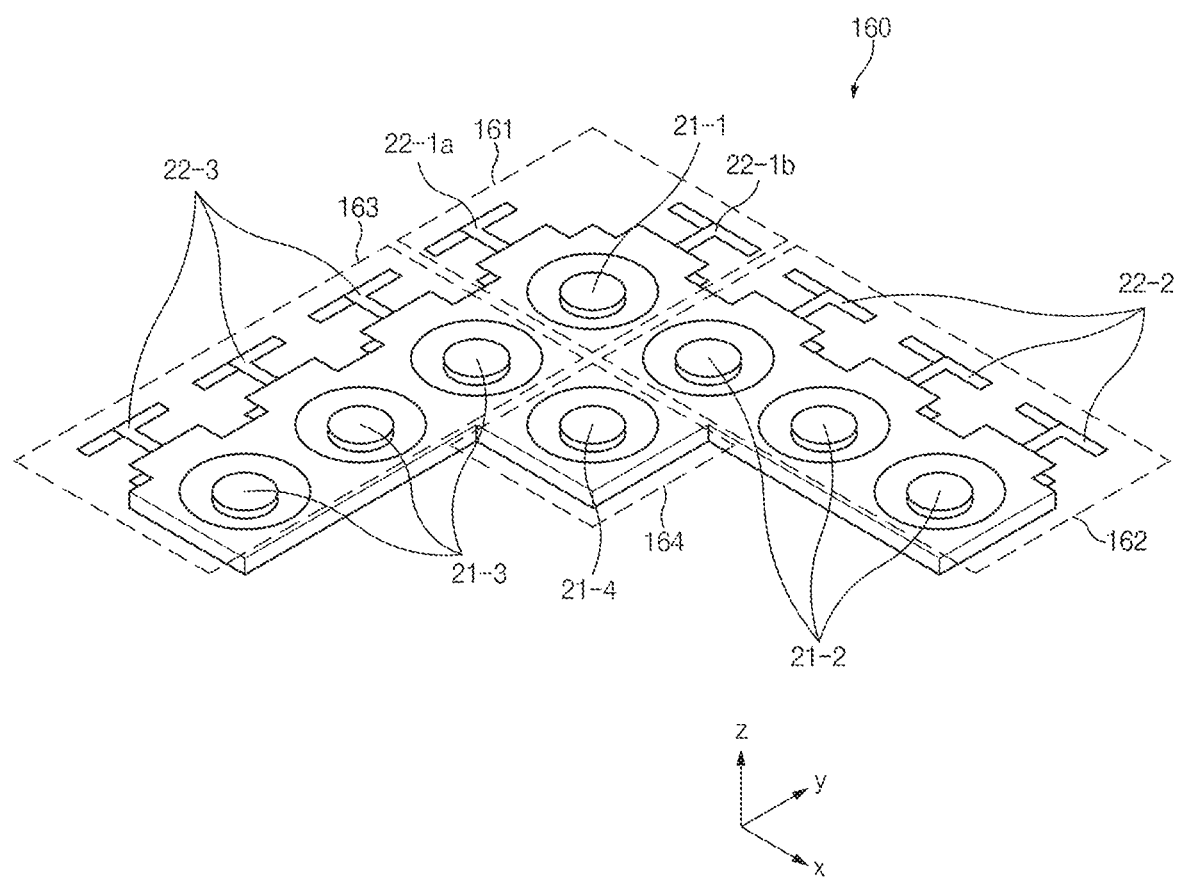
FIG. 2 is a perspective view of an antenna module, according to an embodiment of the disclosure.

FIG. 2 is a perspective view of an antenna module, according to an embodiment of the disclosure.

Referring to FIG. 2, the antenna structure 160 may include a first sub antenna structure 161, a second sub antenna structure 162, a third sub antenna structure 163, and/or a fourth sub antenna structure 164. According to an embodiment, the antenna structure 160 may further include a component not illustrated in FIG. 2 or may not include a part of the components illustrated in FIG. 2. For example, the antenna structure 160 may further include a communication circuit that is disposed below the antenna structure 160, for example, that is disposed in a negative direction of a Z-axis and is electrically connected with antenna elements included in the first sub antenna structure 161, the second sub antenna structure 162, the third sub antenna structure 163, and/or the fourth sub antenna structure 164.

According to an embodiment, the first sub antenna structure 161, the second sub antenna structure 162, the third sub antenna structure 163, and/or the fourth sub antenna structure 164 may be mounted on a printed circuit board. For example, the antenna structure 160 may include a printed circuit board, and the first sub antenna structure 161, the second sub antenna structure 162, the third sub antenna structure 163, and/or the fourth sub antenna structure 164 may be respectively disposed in a partial region of the printed circuit board.

According to an embodiment, the first sub antenna structure 161 may include first group antenna elements 21-1. According to an embodiment, the first group antenna elements 21-1 may include at least one patch antenna. For example, the first group antenna elements 21-1 may include one patch antenna as illustrated in FIG. 2 or may include two or more patch antennas unlike the example illustrated in FIG. 2.

According to an embodiment, the first sub antenna structure 161 may include fifth group antenna elements 22-1a and/or sixth group antenna elements 22-1b. According to an embodiment, each of the fifth group antenna elements 22-1a and/or the sixth group antenna elements 22-1b may include at least one dipole antenna. In an embodiment, the fifth group antenna elements 22-1a and the sixth group antenna elements 22-1b may be arranged in directions that are perpendicular to each other. For example, the fifth group antenna elements 22-1a may be arranged in a direction that faces away from a direction in which the second sub antenna structure 162 is disposed, for example, a first direction (e.g., an X-axis direction) from the first sub antenna structure 161.

The sixth group antenna elements 22-1b may be arranged in a direction that faces away from a direction in which the third sub antenna structure 163 is disposed, for example, a second direction (e.g., a negative direction of a Y-axis) from the first sub antenna structure 161.

According to an embodiment, the second sub antenna structure 162 may include second group antenna elements 21-2. According to an embodiment, the second group antenna elements 21-2 may include at least one patch antenna disposed in the first direction, for example, the X-axis direction from the first sub antenna structure 161. According to an embodiment, the number of second group antenna elements 21-2 is not limited to the example illustrated in FIG. 2. For example, the second group antenna elements 21-2 may include three patch antennas as illustrated in FIG. 2 or may include one, two, or four or more patch antennas unlike the example illustrated in FIG. 2. In an embodiment, the first group antenna elements 21-1 included in the first sub antenna structure 161 and the second group antenna elements 21-2 included in the second sub antenna structure 162 may form a first antenna array.

According to an embodiment, the second sub antenna structure 162 may include seventh group antenna elements 22-2 disposed in a Y-axis direction. According to an embodiment, the seventh group antenna elements 22-2 may include at least one dipole antenna. According to an embodiment, the seventh group antenna elements 22-2 may form a fourth antenna array together with the sixth group antenna elements 22-1b included in the first sub antenna structure 161.

According to an embodiment, the third sub antenna structure 163 may include third group antenna elements 21-3. According to an embodiment, the third group antenna elements 21-3 may include a plurality of patch antennas arranged in the second direction perpendicular to the first direction, for example, the negative direction of the Y-axis from the first sub antenna structure 161. According to an embodiment, the number of third group antenna elements 21-3 is not limited to the example illustrated in FIG. 2. For example, the third group antenna elements 21-3 may include three patch antennas as illustrated in FIG. 2 or may include one, two, or four or more patch antennas unlike the example illustrated in FIG. 2. In an embodiment, the first group antenna elements 21-1 included in the first sub antenna structure 161 and the third group antenna elements 21-3 included in the third sub antenna structure 163 may form a second antenna array.

According to an embodiment, the third sub antenna structure 163 may include eighth group antenna elements 22-3 disposed in the negative direction of the Y-axis. According to an embodiment, the eighth group antenna elements 22-3 may include at least one dipole antenna. According to an embodiment, the eighth group antenna elements 22-3 may form a fifth antenna array together with the fifth group antenna elements 22-1a included in the first sub antenna structure 161.

According to an embodiment, the fourth sub antenna structure 164 may include fourth group antenna elements 21-4. According to an embodiment, the fourth group antenna elements 21-4 may include at least one patch antenna. In an embodiment, the fourth group antenna elements 21-4 may include one patch antenna forming a two-dimensional array, for example, a 2×2 array together with at least some antenna elements of the first group antenna elements 21-1, at least some antenna elements of the second group antenna elements 21-2, or at least some antenna elements of the third group antenna elements 21-3.

According to an embodiment, the number of fourth group antenna elements 21-4 is not limited to the example illustrated in FIG. 2. For example, the fourth group antenna elements 21-4 may include four patch antennas disposed to form a 3×3 array together with at least some antenna elements of the first group antenna elements 21-1, at least some antenna elements of the second group antenna elements 21-2, or at least some antenna elements of the third group antenna elements 21-3. In an embodiment, a plurality of antenna elements forming the two-dimensional array may form a third antenna array.

According to an embodiment, at least one antenna element (e.g., at least a part of the first group antenna elements 21-1) belonging to the antenna structure 160 may be shared by a plurality of antenna arrays (e.g., the first antenna array, the second antenna array, or the third antenna array), thus increasing the spatial efficiency. For example, the antenna structure 160 including the shared antenna element may transmit and/or receive signals in a plurality of directions and may also have a smaller size. In the disclosure, the description given with reference to FIG. 2 may be identically applied to components having the same reference numerals/marks as the components of the antenna structure 160 described with reference to FIG. 2.

Figure 3A:
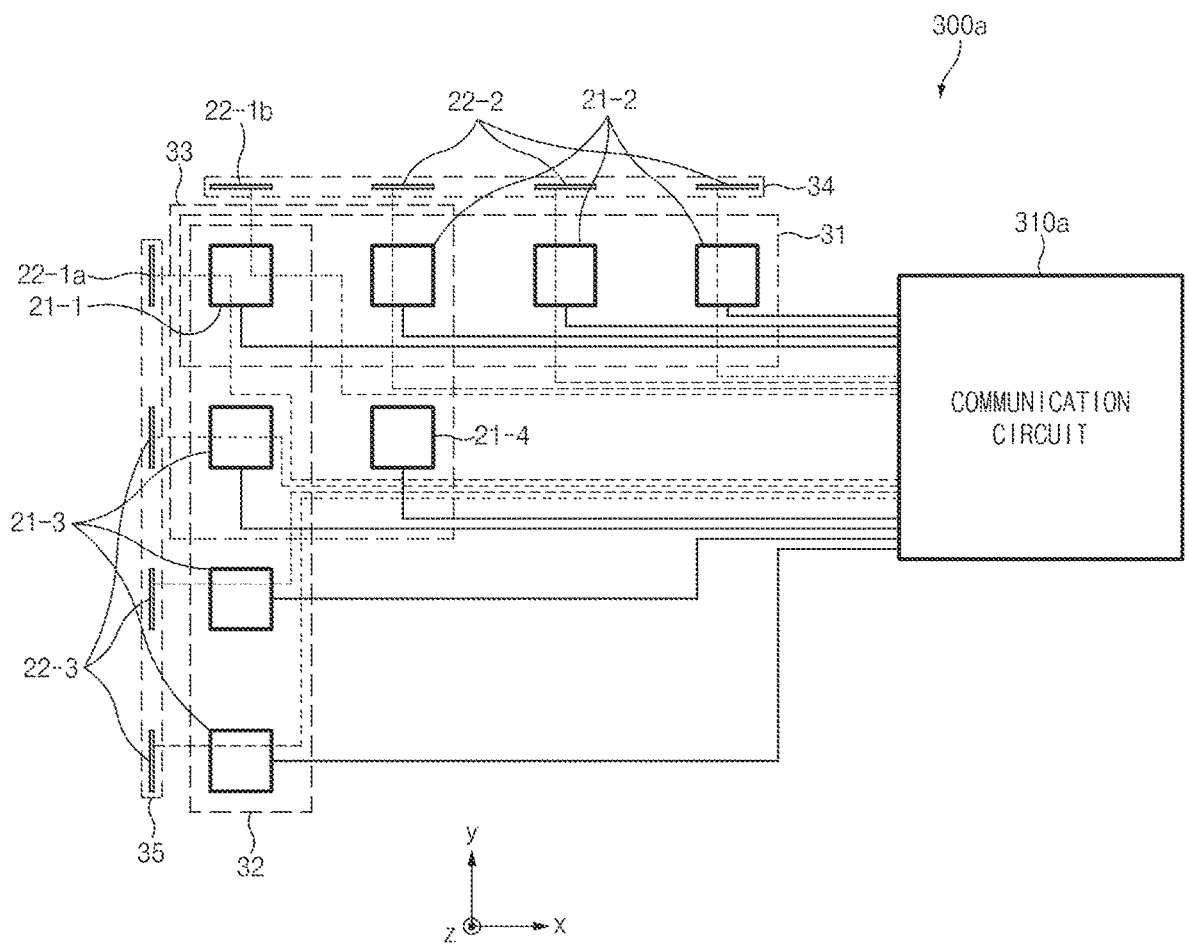
FIG. 3A illustrates a connection relationship between an antenna structure and a communication circuit included in an electronic device, according to an embodiment of the disclosure.

FIG. 3A illustrates a connection relationship between an antenna structure and a communication circuit included in an electronic device, according to an embodiment of the disclosure.

Referring to FIG. 3A, an electronic device 300a may include the first group antenna elements 21-1, the second group antenna elements 21-2, the third group antenna elements 21-3, the fourth group antenna elements 21-4, the fifth group antenna elements 22-1a, the sixth group antenna elements 22-1b, the seventh group antenna elements 22-2, the eighth group antenna elements 22-3, and/or a communication circuit 310a. A plurality of antenna elements illustrated in FIG. 3A, for example, the first group antenna elements 21-1, the second group antenna elements 21-2, the third group antenna elements 21-3, the fourth group antenna elements 21-4, the fifth group antenna elements 22-1a, the sixth group antenna elements 22-1b, the seventh group antenna elements 22-2, and/or the eighth group antenna elements 22-3 may be understood as briefly illustrating a plurality of antenna elements included in the antenna structure 160 illustrated in FIG. 2.

According to an embodiment, the electronic device 300a may not include a part of the components illustrated in FIG. 3A or may further include any other component(s) not illustrated in FIG. 3A. For example, the electronic device 300a may not include a part of the fifth group antenna elements 22-1a, the sixth group antenna elements 22-1b, the seventh group antenna elements 22-2, and the eighth group antenna elements 22-3. For another example, the electronic device 300a may further include patch antennas not illustrated in FIG. 3A.

According to an embodiment, the plurality of antenna elements may form a plurality of antenna arrays including the first group antenna elements 21-1. For example, the first group antenna elements 21-1 and the second group antenna elements 21-2 may form a first antenna array 31, and the first group antenna elements 21-1 and the third group antenna elements 21-3 may form a second antenna array 32. For another example, antenna elements forming a two-dimensional array including the first group antenna elements 21-1 and the fourth group antenna elements 21-4 may form a third antenna array 33.

According to an embodiment, the first antenna array 31, the second antenna array 32, and the third antenna array 33 may be configured to communicate in different directions. For example, directions for obtaining maximum antenna gains of the first antenna array 31, the second antenna array 32, and the third antenna array 33 may be at least partially different. The electronic device 300a may communicate with a base station or any other electronic device in the different directions. According to an embodiment, the electronic device 300a may transmit or receive millimeter wave signals omnidirectionally by using the plurality of antenna arrays (e.g., the first antenna array 31, the second antenna array 32, and the third antenna array 33).

According to an embodiment, the sixth group antenna elements 22-1b and the seventh group antenna elements 22-2 may form a fourth antenna array 34, and the fifth group antenna elements 22-1a and the eighth group antenna elements 22-3 may form a fifth antenna array 35. In an embodiment, the fourth antenna array 34 and the fifth antenna array 35 may be configured to communicate in different directions, for example, in directions perpendicular to each other.

According to an embodiment, respective antenna elements included in the electronic device 300a may be electrically connected with the communication circuit 310a. For example, the antennas 21-1, 21-2, 21-3, 21-4, 22-1a, 22-1b, 22-2, and 22-3 included in the electronic device 300a may be electrically connected with the communication circuit 310a through conducting wires. In an embodiment, the antennas 21-1, 21-2, 21-3, 21-4, 22-1a, 22-1b, 22-2, and 22-3 may include a dipole antenna, a patch antenna, and/or a loop antenna. For example, each of the antennas 21-1, 21-2, 21-3, and 21-4 may be a patch antenna. For another example, each of the antennas 22-1a, 22-1b, 22-2, and 22-3 may be a dipole antenna.

According to an embodiment, the communication circuit 310a may individually activate the antenna elements electrically connected therewith. For example, the communication circuit 310a may include a plurality of switches (not illustrated) that may be used to provide power to the respective antenna elements. The communication circuit 310a may individually activate antenna elements by turning on or off the plurality of switches, individually. For another example, under control of the communication circuit 310a, a specified signal may be applied to each antenna element or may not be applied to each antenna element. An antenna element to which the signal is applied may be activated, and an antenna element to which the signal is not applied may be deactivated.

In the disclosure, the expression "activating an antenna element" may be understood as the expression "providing power to an antenna element". For example, the communication circuit 310a may be configured to provide power to at least a part of a plurality of antenna elements included in an antenna structure and to transmit and/or receive a millimeter wave signal by using the antenna element supplied with the power.

For example, the communication circuit 310a may provide power to antenna elements included in the first antenna array 31 and may transmit and/or receive a millimeter wave signal by using at least one beam, a main direction of which is the Z-axis direction and which is formed to be long in the Y-axis direction. For another example, the communication circuit 310a may provide power to antenna elements included in the second antenna array 32 and may transmit and/or receive a millimeter wave signal by using at least one beam, a main direction of which is the Z-axis direction and which is formed to be long in the X-axis direction. For another example, the communication circuit 310a may provide power to antenna elements included in the third antenna array 33 and may transmit and/or receive a millimeter wave signal by using at least one beam, a main direction of which is the Z-axis direction and which is formed in the shape of an XY plane. A shape of a beam that is formed depending on an antenna array will be further described with reference to FIGS. 4B, 5B, and 6B.

According to an embodiment, the communication circuit 310a may have a plurality of operating modes. For example, the communication circuit 310a may have a first mode using the first antenna array 31, a second mode using the second antenna array 32, and a third mode using the third antenna array 33 as the operating modes. In an embodiment, the communication circuit 310a may operate in one operating mode of the plurality of operating modes, and the operating mode may be determined based on a state of the electronic device 300a, for example, a communication state, a posture of the electronic device 300a, and/or a grip state of the user.

According to an embodiment, the electronic device 300a may further include at least one processor unlike the example illustrated in FIG. 3A. For example, the at least one processor may include an application processor (AP), a communication processor (CP), or the like. In an embodiment, the at least one processor may be electrically connected with the communication circuit 310a and may control an operation of the communication circuit 310a. For example, the at least one processor may change an operating mode of the communication circuit 310a such that a communication performance of the electronic device 300a is maintained at a specified level or higher.

According to an embodiment, the at least one processor may determine a level of the communication performance of the electronic device 300a. For example, the at least one processor may determine a level of the communication performance of the electronic device 300a, based on at least one of a reference signal received power (RSRP), a reference signal received quality (RSRQ), a received signal strength index (RSSI), or a signal noise ratio (SNR).

In an embodiment, the at least one processor may change an operating mode of the communication circuit 310a when the communication performance is lower than the specified level. For example, when the communication circuit 310a operates in the first mode and a direction of a base station with which the electronic device 300a communicates is changed from the electronic device 300a to the Z-axis direction, the at least one processor may determine that a communication performance of the electronic device 300a is lower than the specified level. In this case, the electronic device 300a may obtain the communication performance of the specified level or higher by making an antenna gain high in the Z-axis direction. For example, the at least one processor may change an operating mode of the communication circuit 310a to the third mode and may allow the communication circuit 310a to transmit and/or receive a millimeter wave signal in the Z-axis direction by using the third antenna array 33.

According to an embodiment, the at least one processor may control the communication circuit 310a such that the communication circuit 310a operates in one of the first mode, the second mode, and the third mode, based on a posture of the electronic device 300a. For example, the electronic device 300a may include at least one sensor, for example, a gyro sensor, an acceleration sensor, a geomagnetic sensor, or the like, for the purpose of sensing a posture of the electronic device 300a. In an embodiment, the at least one processor may determine a posture of the electronic device 300a by using the at least one sensor. For example, the at least one processor may determine which of a front surface, a back surface, or a side surface of the electronic device 300a faces a ground. In an embodiment, when it is determined that the front surface of the electronic device 300a faces the ground, the electronic device 300a may allow a beam to be formed in a direction different from a direction facing the ground. According to an embodiment, the at least one processor may control the communication circuit 310a such that the communication circuit 310a operates in the first mode or the second mode, but not the third mode.

According to an embodiment, the at least one processor may control the communication circuit 310a based on a state where the user grips the electronic device 300a, such that the communication circuit 310a operates in one of the first mode, the second mode, or the third mode. For example, the electronic device 300a may include at least one sensor, for example, a proximity sensor for the purpose of sensing a grip state of the user. In an embodiment, the at least one processor may determine information of a location where a grip of the user is made, by using the at least one sensor. For example, the at least one processor may determine whether a grip of the user is made on which of the front surface, the back surface, or the side surface of the electronic device 300a. In an embodiment, when it is determined that the grip of the user is made on the side surface of the electronic device 300a, the electronic device 300a may allow a beam to be formed in a direction different from a direction facing the side surface. For example, the at least one processor may control the communication circuit 310a such that the communication circuit 310a operates in the third mode.

In the disclosure, the description given with reference to FIG. 3A may be identically applied to components having the same reference numerals/marks as the components of the electronic device 300a illustrated in FIG. 3A, for example, to the antenna arrays 31, 32, and 33.

Figure 3B:
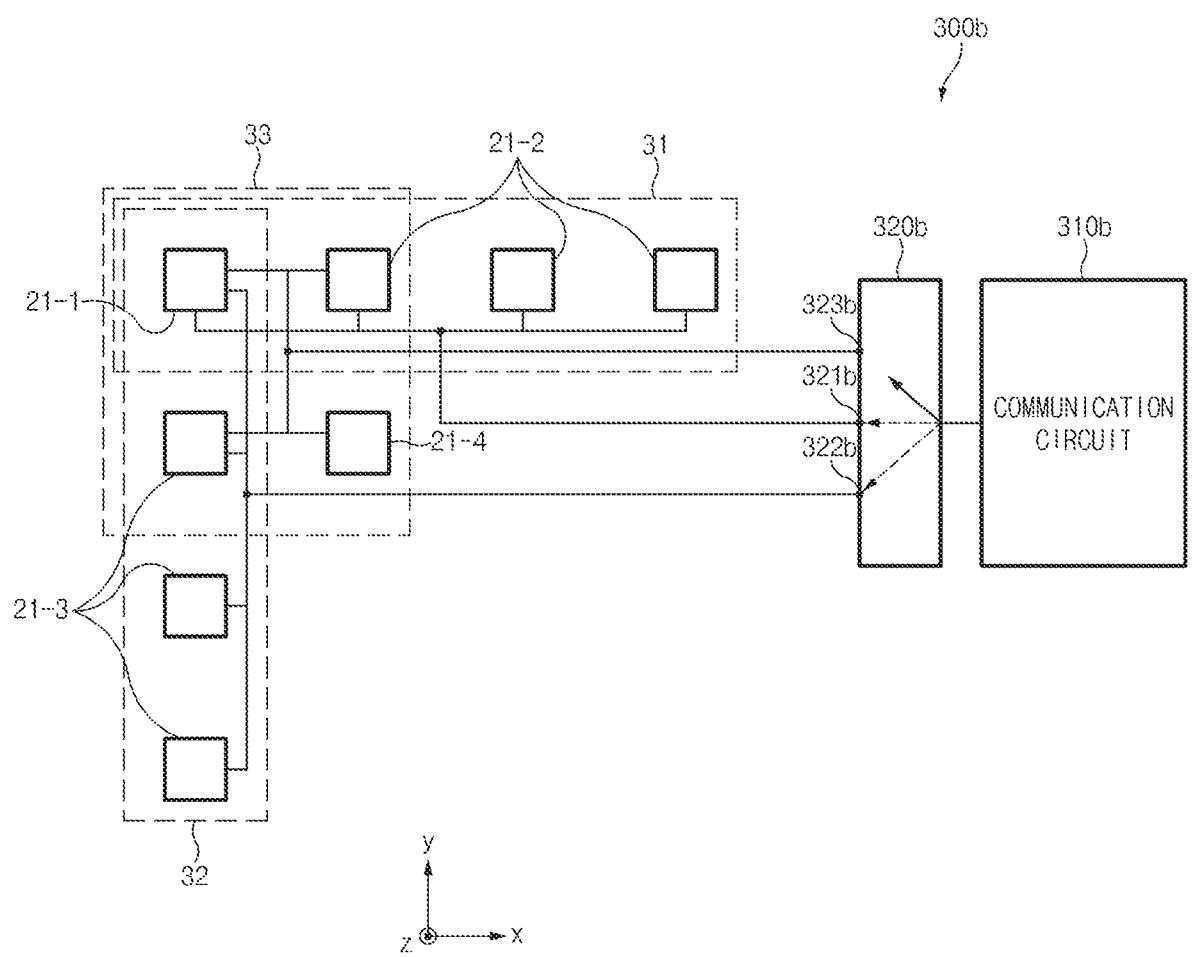
FIG. 3B illustrates a connection relationship between an antenna structure and a communication circuit included in an electronic device, according to an embodiment of the disclosure.
Figure 3C:
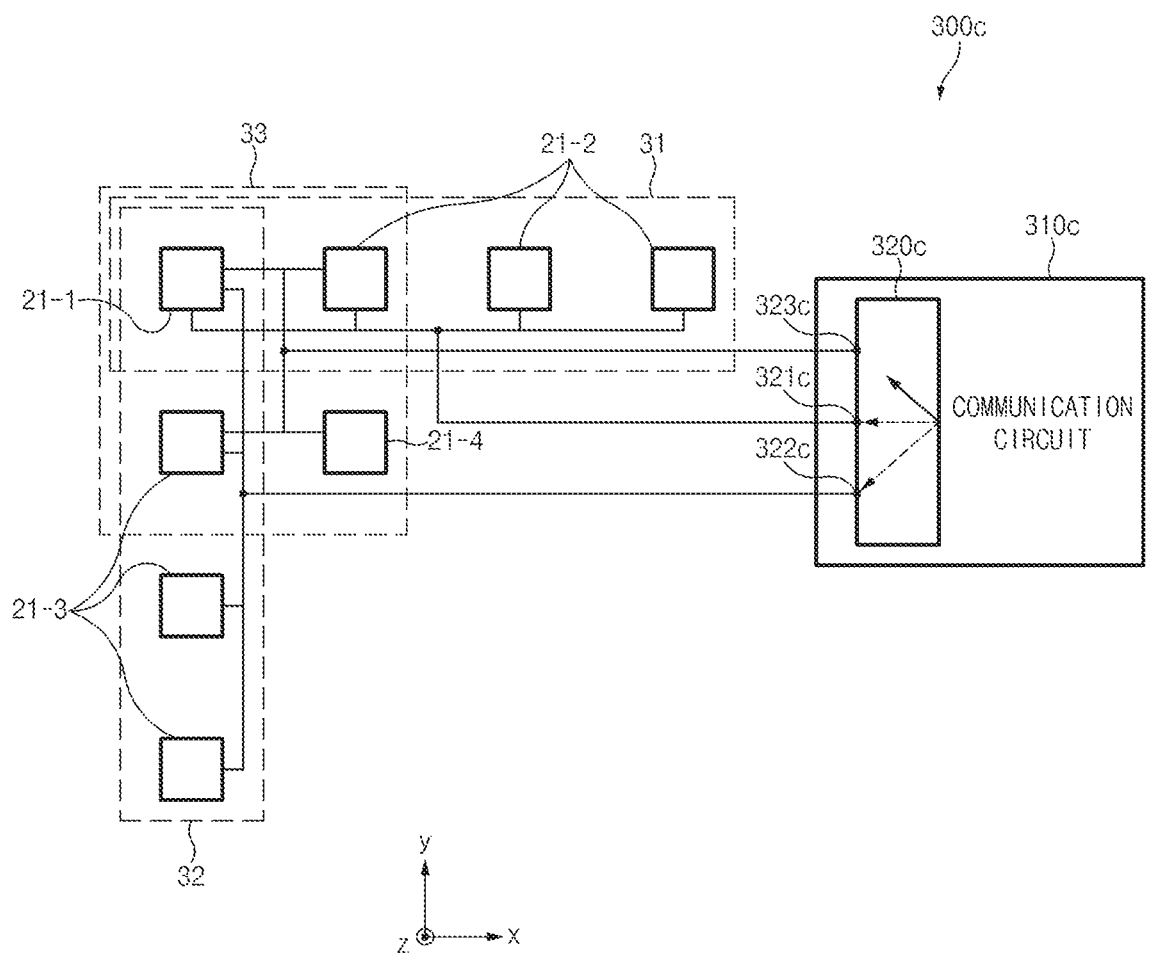
FIG. 3C illustrates a connection relationship between an antenna structure and a communication circuit included in an electronic device, according to an embodiment of the disclosure.

FIG. 3B illustrates a connection relationship between an antenna structure and a communication circuit included in an electronic device, according to an embodiment of the disclosure. FIG. 3C illustrates a connection relationship between an antenna structure and a communication circuit included in an electronic device, according to an embodiment of the disclosure.

Referring to FIGS. 3B and 3C, an electronic device 300b or 300c may include the first group antenna elements 21-1, the second group antenna elements 21-2, the third group antenna elements 21-3, the fourth group antenna elements 21-4, a switch 320b or 320c, and a communication circuit 310b or 310c. The description given with reference to FIG. 3A will be omitted upon describing FIGS. 3B and 3C.

According to an embodiment, the electronic device 300b or 300c may not include fifth group antenna elements, sixth group antenna elements, seventh group antenna elements, and eighth group antenna elements. According to an embodiment, unlike the example illustrated in FIGS. 3B and 3C, the electronic device 300b or 300c may further include the fifth group antenna elements, the sixth group antenna elements, the seventh group antenna elements, and the eighth group antenna elements. In this case, a description associated with the fifth to eighth group antenna elements may be the same as or similar to the description given with reference to FIG. 3A.

According to an embodiment, the switch 320b or 320c may selectively connect the communication circuit 310b or 310c and antenna elements. For example, the switch 320b or 320c may include a first terminal 321b or 321c electrically connected with antenna elements included in the first antenna array 31, a second terminal 322b or 322c electrically connected with antenna elements included in the second antenna array 32, and a third terminal 323b or 323c electrically connected with antenna elements included in the third antenna array 33. In an embodiment, the communication circuit 310b or 310c may be electrically connected with one of the first terminal 321b or 321c, the second terminal 322b or 322c, or the third terminal 323b or 323c by using the switch 320b or 320c and may change an operating mode. According to an embodiment, each of the switches 320b and 320c may be implemented with a multiplexer.

According to an embodiment, the switch 320b may be implemented with a component independent of the communication circuit 310b as illustrated in FIG. 3B, and the switch 320c may be included in the communication circuit 310c as illustrated in FIG. 3C. For example, the switch 320c and the communication circuit 310c may be implemented with one integrated circuit (IC).

According to an embodiment, the electronic device 300b or 300c may further include at least one processor unlike the example illustrated in FIG. 3B or 3C. In an embodiment, the at least one processor may control an operation of the communication circuit 310b or 310c or the switch 320b or 320c. For example, the at least one processor may change an operating mode of the communication circuit 310b or 310c by controlling the switch 320b or 320c such that a communication performance of the electronic device 300b or 300c is maintained at a specified level or higher.

According to an embodiment, as compared with the electronic device 300a, the electronic device 300b or the electronic device 300c may change an operating mode of the communication circuit 310b or 310c more efficiently through the switch 320b or the switch 320c. For example, the electronic device 300b or 300c may allow power to be fed to a plurality of antenna elements at the same time depending on an operating mode, without independently feeding power to the antenna elements.

According to an embodiment, as compared with the electronic device 300b, the electronic device 300c may decrease an influence of the switch 320c on the antenna performance. For example, in the electronic device 300c, because the switch 320c is present within the communication circuit 310c, a reflection component of a signal radiated from an antenna structure may decrease. The decrease in the reflection component makes an antenna gain relatively increase, and thus, the communication performance of the electronic device 300c may be improved.

Figure 4A:
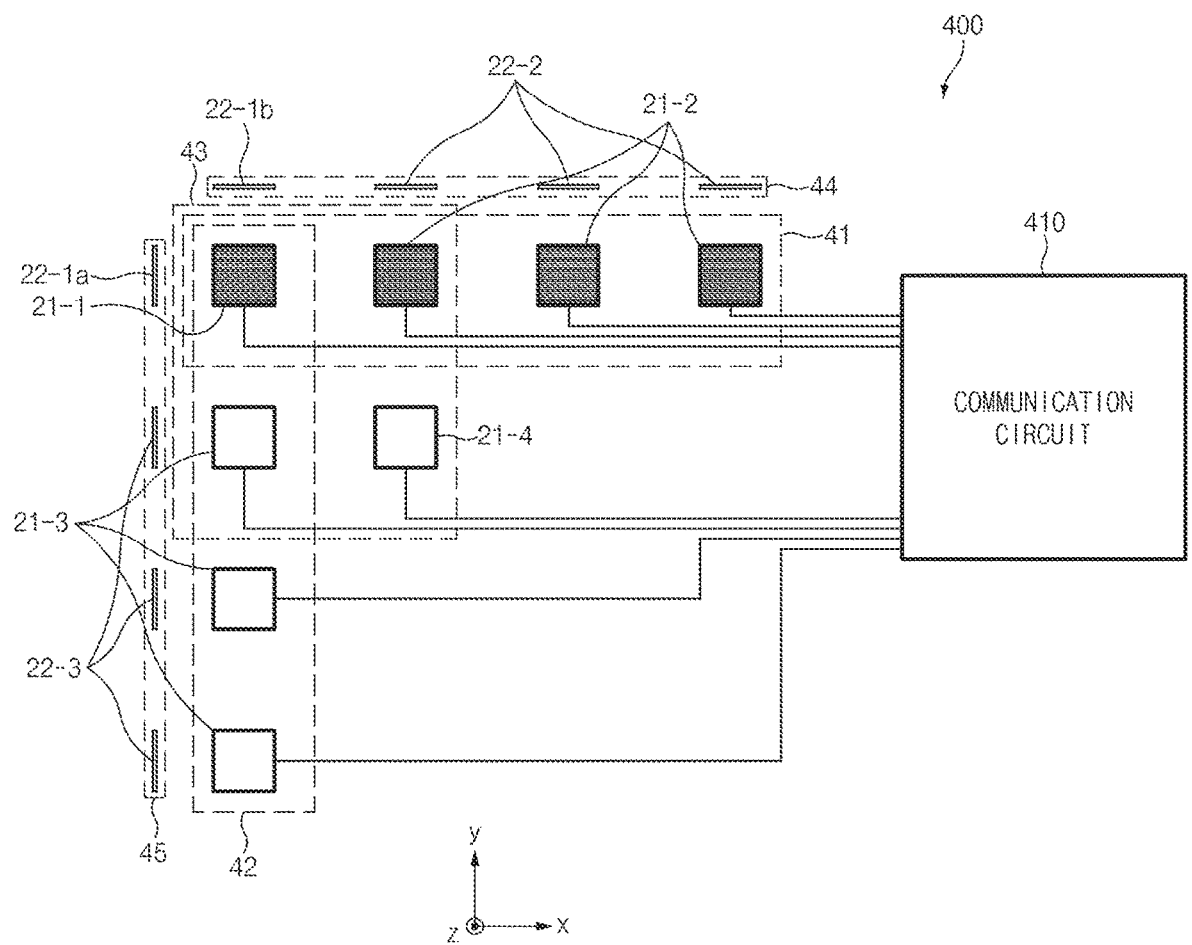
FIG. 4A illustrates an electronic device operating in a first mode, according to an embodiment of the disclosure.
Figure 4B:
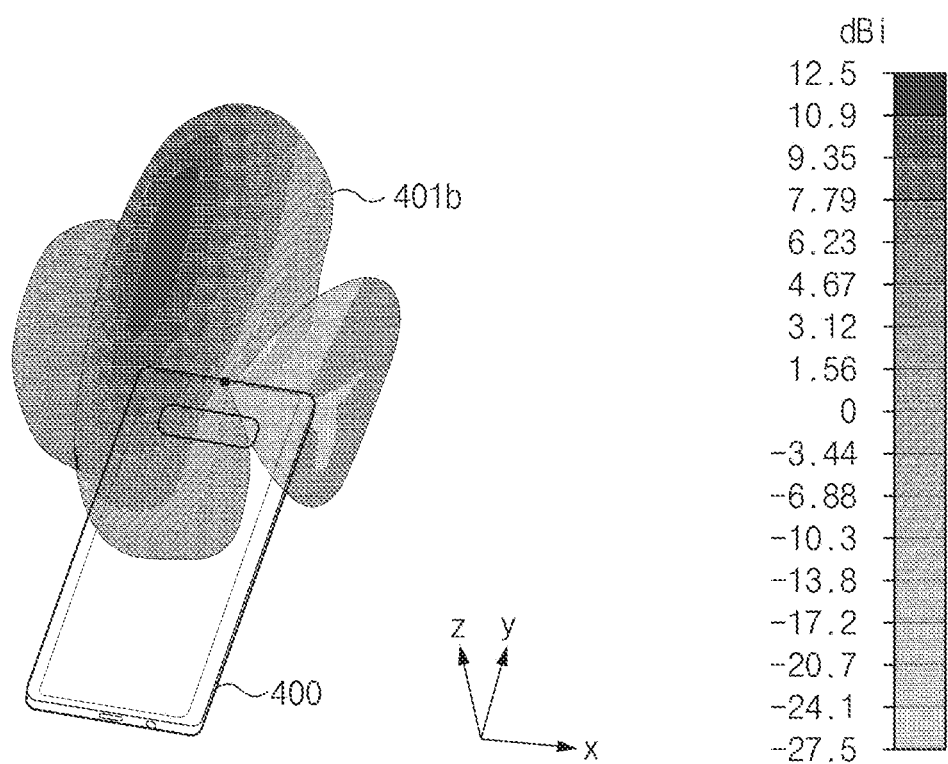
FIG. 4B illustrates an electronic device operating in a first mode and a beam pattern of the electronic device, according to an embodiment of the disclosure.
Figure 4C:
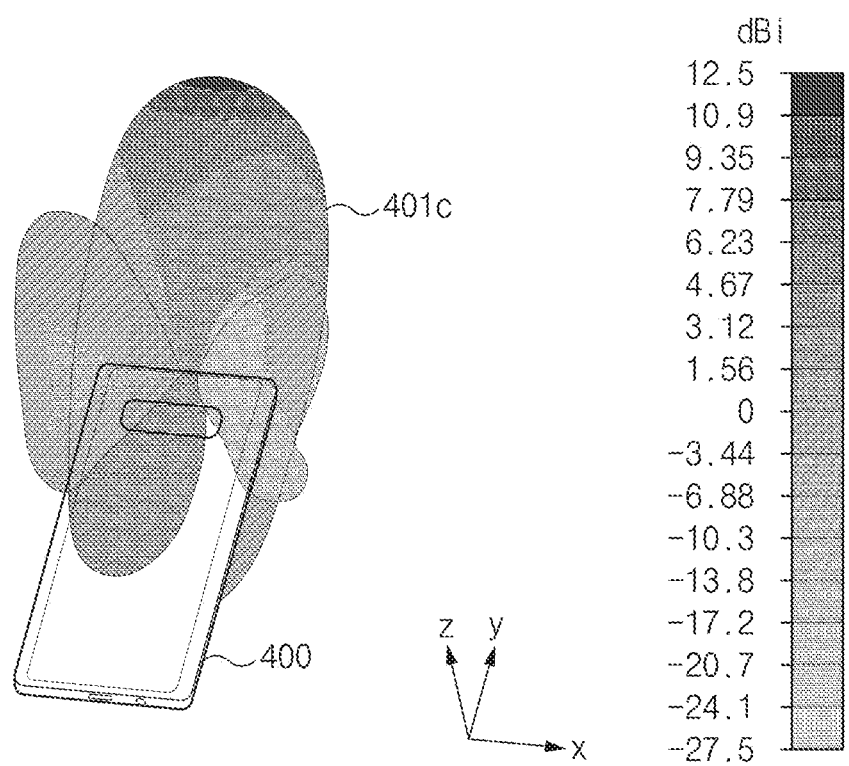
FIG. 4C illustrates an electronic device operating in a first mode and a beam pattern of the electronic device, according to an embodiment of the disclosure.

FIG. 4A illustrates an electronic device operating in a first mode, according to an embodiment of the disclosure. FIG. 4B illustrates an electronic device operating in a first mode and a beam pattern of the electronic device, according to an embodiment of the disclosure. FIG. 4C illustrates an electronic device operating in a first mode and a beam pattern of the electronic device, according to an embodiment of the disclosure.

Referring to FIG. 4A, an electronic device 400 may include the first group antenna elements 21-1, the second group antenna elements 21-2, the third group antenna elements 21-3, the fourth group antenna elements 21-4, the fifth group antenna elements 22-1a, the sixth group antenna elements 22-1b, the seventh group antenna elements 22-2, the eighth group antenna elements 22-3, and/or a communication circuit 410.

According to an embodiment, each of antenna elements included in the electronic device 400 may be electrically connected with the communication circuit 410. Conducting wires electrically connecting the antenna elements and the communication circuit 410 are not illustrated in FIG. 4A, but the conducting wires may be understood to be the same as or similar to thin dotted lines illustrated in FIG. 3A. In an embodiment, the electronic device 400 is not limited to the example illustrated in FIG. 4A. For example, the electronic device 400 may be the same as or similar to one of the electronic devices 300a, 300b, and 300c illustrated in FIGS. 3A, 3B, and 3C.

According to an embodiment, the electronic device 400 may operate in the first mode. For example, the electronic device 400 may transmit and/or receive a millimeter wave signal by using a first antenna array 41, for example, the first group antenna elements 21-1 and the second group antenna elements 21-2. In this case, the communication circuit 410 may apply a feed signal to the antenna elements 21-1 and 21-2 constituting the first antenna array 41. According to an embodiment, the electronic device 400 may transmit and/or receive a millimeter wave signal by using a fourth antenna array 44, for example, the sixth group antenna elements 22-1b and the seventh group antenna elements 22-2. In this case, the communication circuit 410 may apply a feed signal to the antenna elements 22-1b and 22-2 constituting the fourth antenna array 44.

According to an embodiment, the antenna elements 21-1 and 21-2 included in the first antenna array 41 may transmit and/or receive a millimeter wave signal, a main direction of which is the Z-axis direction. For example, the antenna elements 21-1 and 21-2 included in the first antenna array 41 may include patch antennas arranged in the X-axis direction. The electronic device 400 may respectively apply signals having specified phase differences to the patch antennas, and the patch antennas to which the signals are applied may form at least one beam in the Z-axis direction.

According to an embodiment, the antenna elements 22-1b and 22-2 included in the fourth antenna array 44 may form at least one beam in the Y-axis direction. The electronic device 400 may respectively apply signals having specified phase differences to the antenna elements 22-1b and 22-2, and the antenna elements 22-1b and 22-2 to which the signals are applied may form at least one beam in the Y-axis direction.

The electronic device 400 operating in the first mode and a beam pattern 401b formed at the electronic device 400 are illustrated in FIG. 4B. The electronic device 400 that operates in the first mode may form at least one beam, a main direction of which is the Z-axis direction, and which is elongated along a YZ plane, by using the antenna elements 21-1 and 21-2 (e.g., patch antennas). It is observed that, because the antenna elements 21-1 and 21-2 form a beam in the Z-axis direction, an antenna gain in the Z-axis direction is the greatest and a beam width in a lengthwise direction widens due to the antenna elements 21-1 and 21-2 arranged widthwise.

The electronic device 400 operating in the first mode and a beam pattern 401c formed at the electronic device 400 are illustrated in FIG. 4C. It is observed that an antenna gain in the Y-axis direction is the greatest because the electronic device 400 operating in the first mode transmits or receives a millimeter wave signal, a main direction of which is the Y-axis direction, by using the antenna elements 22-1b and 22-2.

Figure 5A:
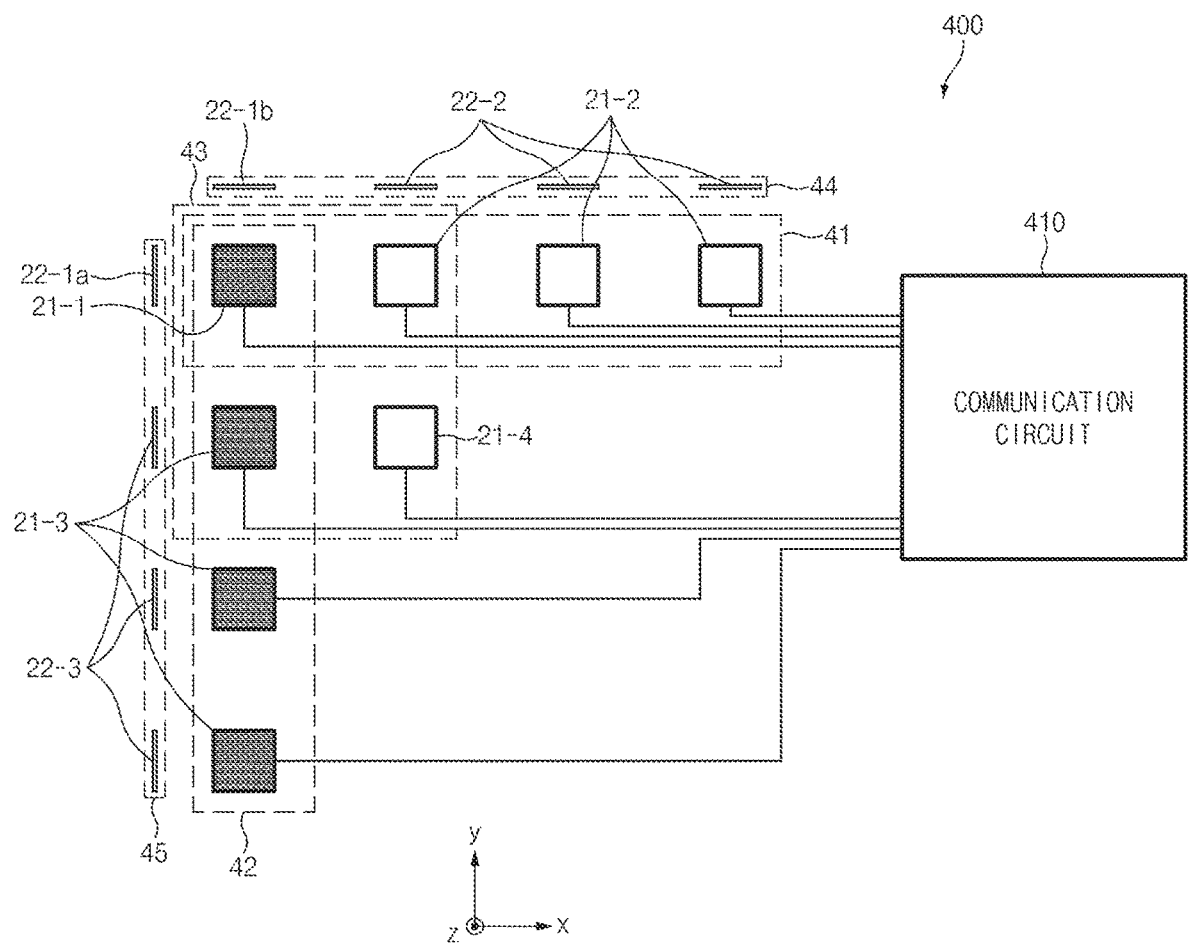
FIG. 5A illustrates an electronic device operating in a second mode, according to an embodiment of the disclosure.
Figure 5B:
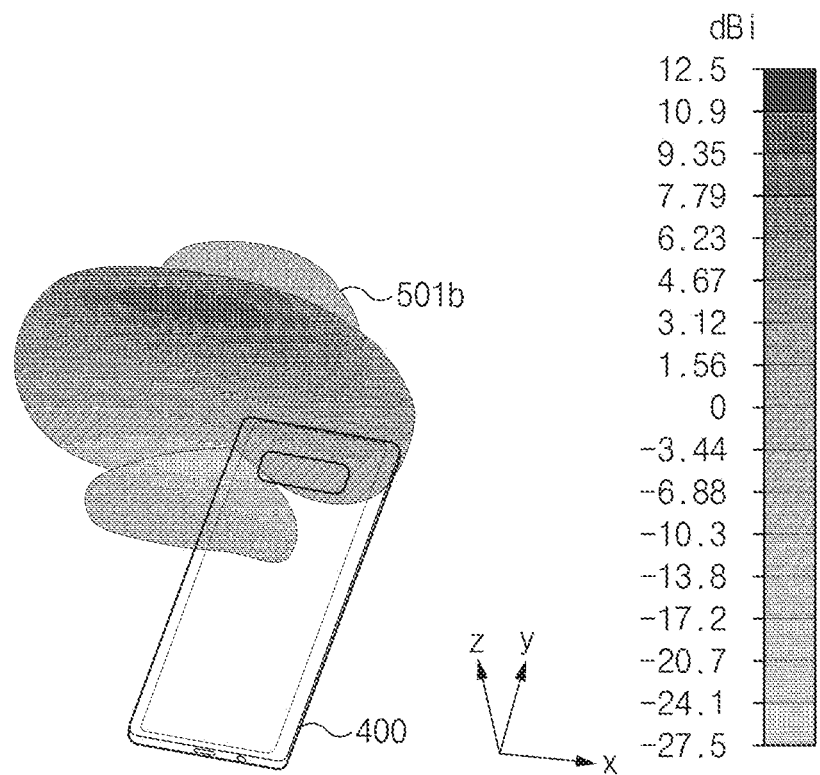
FIG. 5B illustrates an electronic device operating in a second mode and a beam pattern of the electronic device, according to an embodiment of the disclosure.
Figure 5C:
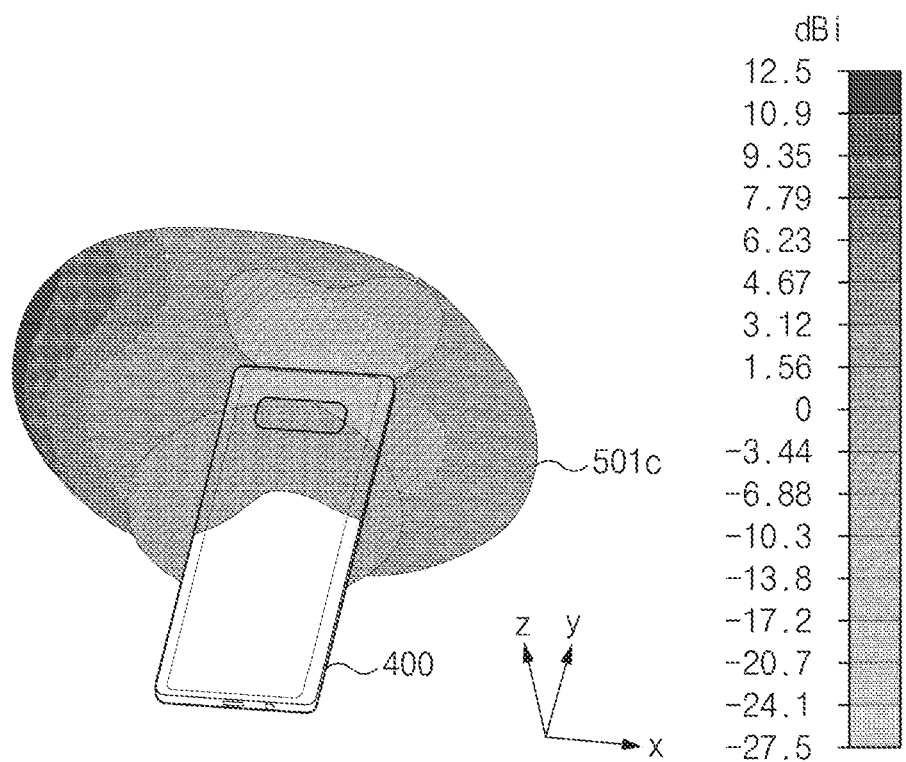
FIG. 5C illustrates an electronic device operating in a second mode and a beam pattern of the electronic device, according to an embodiment of the disclosure.

FIG. 5A illustrates an electronic device operating in a second mode, according to an embodiment of the disclosure. FIG. 5B illustrates an electronic device operating in a second mode and a beam pattern of the electronic device, according to an embodiment of the disclosure. FIG. 5C illustrates an electronic device operating in a second mode and a beam pattern of the electronic device, according to an embodiment of the disclosure.

Referring to FIG. 5A, an electronic device 400 may include the first group antenna elements 21-1, the second group antenna elements 21-2, the third group antenna elements 21-3, the fourth group antenna elements 21-4, the fifth group antenna elements 22-1a, the sixth group antenna elements 22-1b, the seventh group antenna elements 22-2, the eighth group antenna elements 22-3, and/or the communication circuit 410.

According to an embodiment, each of antenna elements included in the electronic device 400 may be electrically connected with the communication circuit 410. Conducting wires electrically connecting the antenna elements and the communication circuit 410 are not illustrated in FIG. 5A, but the conducting wires may be understood to be the same as or similar to thin dotted lines illustrated in FIG. 3A. In an embodiment, the electronic device 400 is not limited to the example illustrated in FIG. 5A. For example, the electronic device 400 may be the same as or similar to one of the electronic devices 300a, 300b, and 300c illustrated in FIGS. 3A to 3C.

According to an embodiment, the electronic device 400 may operate in the second mode. For example, the electronic device 400 may transmit and/or receive a millimeter wave signal by using a second antenna array 42, for example, the first group antenna elements 21-1 and the third group antenna elements 21-3. In this case, the communication circuit 410 may apply a feed signal to the antenna elements 21-1 and 21-3 forming the second antenna array 42. According to an embodiment, the electronic device 400 may transmit and/or receive a millimeter wave signal by using a fifth antenna array 45, for example, the fifth group antenna elements 22-1a and the eighth group antenna elements 22-3. In this case, the communication circuit 410 may apply a feed signal to the antenna elements 22-1a and 22-3 forming the fifth antenna array 45.

According to an embodiment, the antenna elements 21-1 and 21-3 included in the second antenna array 42 may transmit and/or receive a millimeter wave signal, a main direction of which is the Z-axis direction. For example, the antenna elements 21-1 and 21-3 included in the second antenna array 42 may include patch antennas arranged in the Y-axis direction. The electronic device 400 may respectively apply signals having specified phase differences to the antenna elements 21-1 and 21-3 (e.g., patch antennas), and the antenna elements 21-1 and 21-3 to which the signals are applied may form at least one beam in the Z-axis direction.

According to an embodiment, the antenna elements 22-1a and 22-3 included in the fifth antenna array 45 may form at least one beam in the negative direction of the X-axis. The electronic device 400 may respectively apply signals having specified phase differences to the antenna elements 22-1a and 22-3, and the antenna elements 22-1a and 22-3 to which the signals are applied may form at least one beam in the negative direction of the X-axis.

The electronic device 400 operating in the second mode and a beam pattern 501b formed at the electronic device 400 are illustrated in FIG. 5B. The electronic device 400 that operates in the second mode may form at least one beam, a main direction of which is the Z-axis direction, and which is elongated along a ZX plane, by using the antenna elements 21-1 and 21-3. It is observed that, because the antenna elements 21-1 and 21-3 form a beam in the Z-axis direction, an antenna gain in the Z-axis direction is the greatest and a beam width in a widthwise direction widens due to the antenna elements 21-1 and 21-3 arranged lengthwise.

The electronic device 400 operating in the second mode and a beam pattern 501c formed at the electronic device 400 are illustrated in FIG. 5C. It is observed that an antenna gain in the negative direction of the X-axis is the greatest because the electronic device 400 operating in the second mode transmits or receives a millimeter wave signal, a main direction of which is the negative direction of the X-axis, by using the antenna elements 22-1a and 22-3.

Figure 6A:
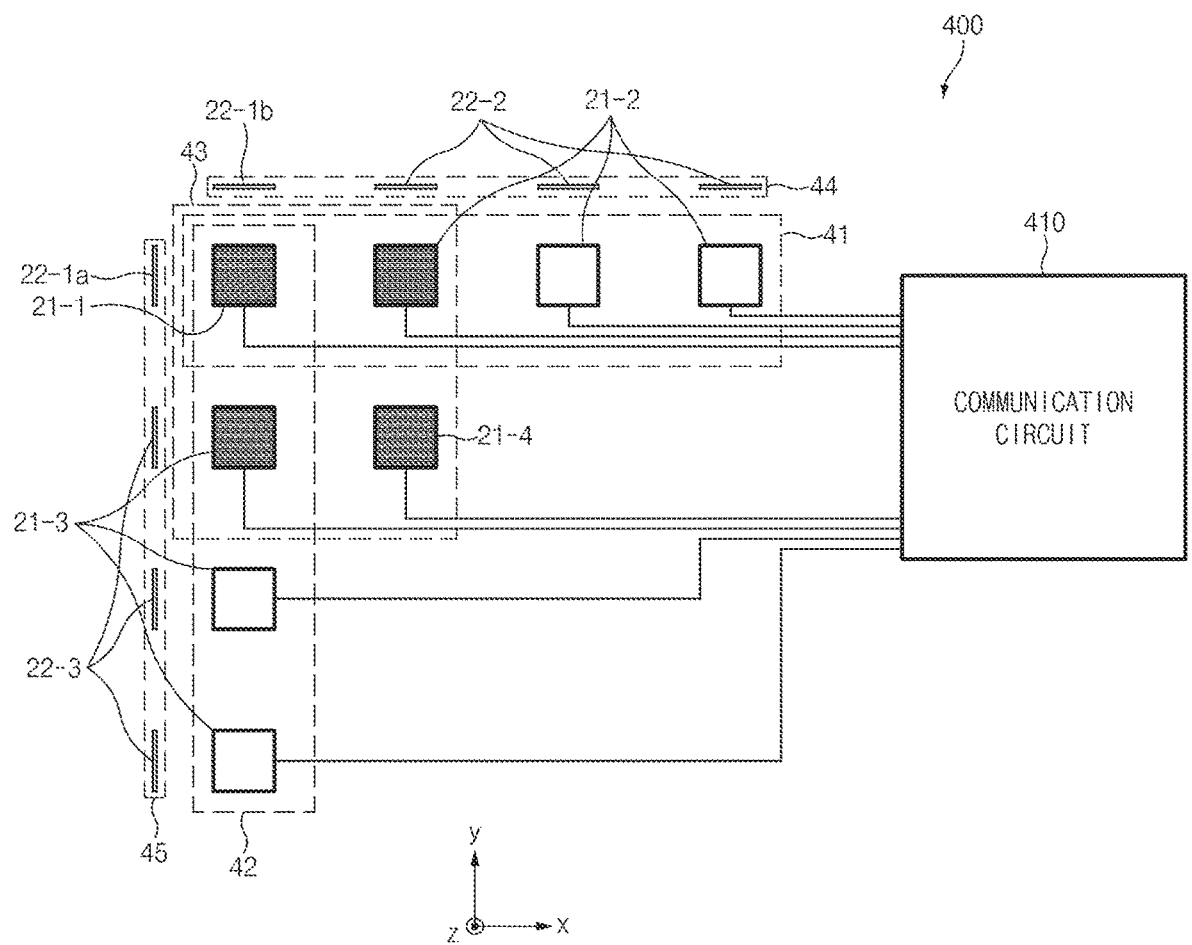
FIG. 6A illustrates an electronic device operating in a third mode, according to an embodiment of the disclosure.
Figure 6B:
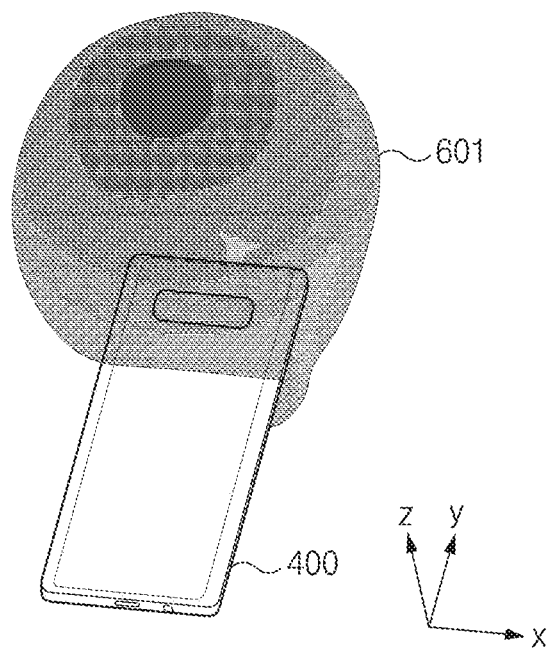
FIG. 6B illustrates an electronic device operating in a third mode and a beam pattern of the electronic device, according to an embodiment of the disclosure.

FIG. 6A illustrates an electronic device operating in a third mode, according to an embodiment of the disclosure. FIG. 6B illustrates an electronic device operating in a third mode and a beam pattern of the electronic device, according to an embodiment of the disclosure.

Referring to FIG. 6A, the electronic device 400 may include the first group antenna elements 21-1, the second group antenna elements 21-2, the third group antenna elements 21-3, the fourth group antenna elements 21-4, the fifth group antenna elements 22-1a, the sixth group antenna elements 22-1b, the seventh group antenna elements 22-2, the eighth group antenna elements 22-3, and/or the communication circuit 410.

According to an embodiment, each of antenna elements included in the electronic device 400 may be electrically connected with the communication circuit 410. Conducting wires electrically connecting the antenna elements and the communication circuit 410 are not illustrated in FIG. 6A, but the conducting wires may be understood to be the same as or similar to thin dotted lines illustrated in FIG. 3A. In an embodiment, the electronic device 400 is not limited to the example illustrated in FIG. 6A. For example, the electronic device 400 may be the same as or similar to one of the electronic devices 300a, 300b, and 300c illustrated in FIGS. 3A to 3C.

According to an embodiment, the electronic device 400 may operate in the third mode. For example, the electronic device 400 may transmit and/or receive a millimeter wave signal by using a third antenna array 43, for example, antenna elements forming a two-dimensional array including the first group antenna elements 21-1 and the fourth group antenna elements 21-4. In an embodiment, the third antenna array 43 may include at least a part of the second group antenna elements 21-2 and at least a part of the third group antenna elements 21-3 for the purpose of implementing the two-dimensional array. In this case, the communication circuit 410 may apply a feed signal to the antenna elements forming the third antenna array 43.

According to an embodiment, the antenna elements included in the third antenna array 43 may transmit and/or receive a millimeter wave signal, a main direction of which is the Z-axis direction. The electronic device 400 may respectively apply signals having specified phase differences to the antenna elements, and the antenna elements to which the signals are applied may form at least one beam in the Z-axis direction.

The electronic device 400 operating in the third mode and a beam pattern 601 formed at the electronic device 400 are illustrated in FIG. 6B. It is observed that an antenna gain in the Z-axis direction is the greatest because the electronic device 400 operating in the third mode transmits or receives a millimeter wave signal, a main direction of which is the Z-axis direction.

Figure 7:
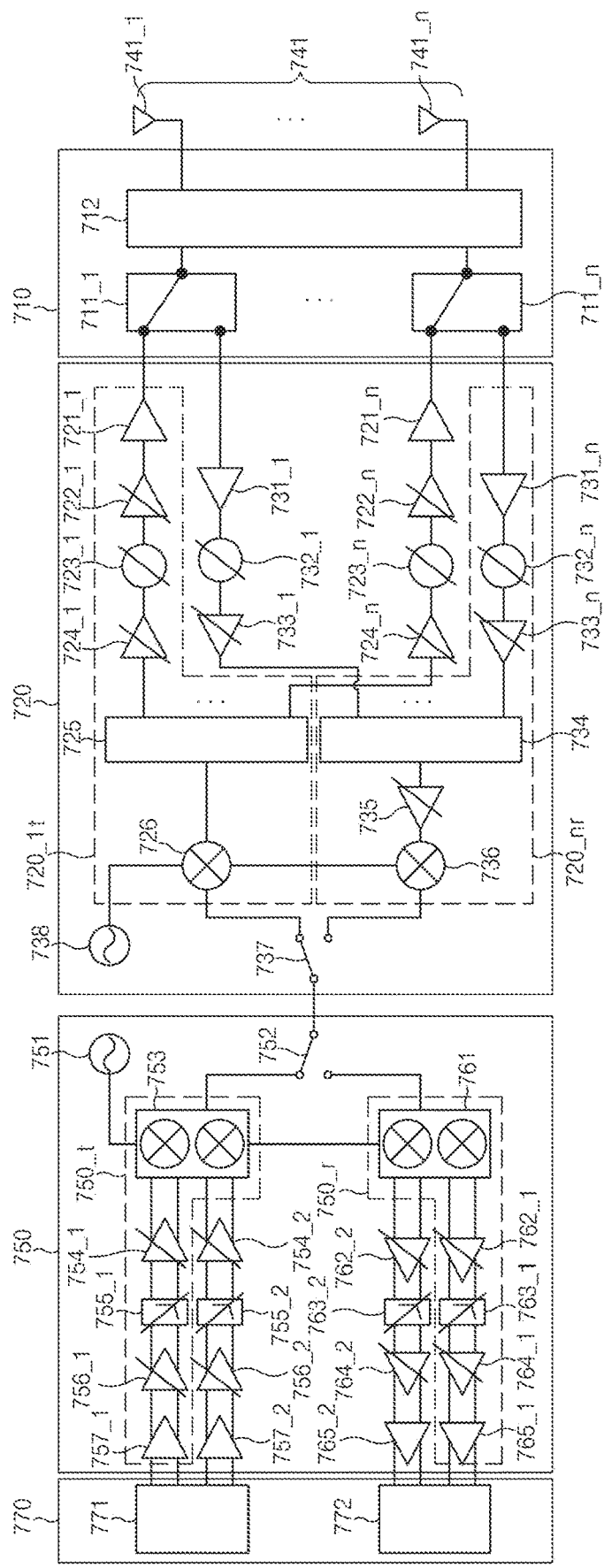
FIG. 7 is a circuit diagram of an electronic device performing 5th generation (5G) communication, according to an embodiment of the disclosure.

FIG. 7 is a circuit diagram of an electronic device performing 5$^{th}$ generation (5G) communication, according to an embodiment of the disclosure.

Referring to FIG. 7, an electronic device (e.g., the electronic device 100 of FIG. 1) may include an antenna group 741, a switch group 710, a radio frequency integrated circuit (RFIC) 720, an IFIC 750, and/or a communication processor 770. In an embodiment, the electronic device may further include one or more components not illustrated in FIG. 7 or may not include a part of the components illustrated in FIG. 7. For example, the electronic device may further include an additional RFIC.

According to an embodiment, antenna elements (e.g., 741_1 to 741_n) included in the antenna group 741 may be connected with the RFIC 720 through the switch group 710. For example, in the case where the electronic device (e.g., the electronic device 100 of FIG. 1) transmits an RF signal (e.g., in the case of a signal transmit mode), a switch 711_1 may connect an antenna element 741_1 and a power amplifier (PA) 721_1; in the case where the electronic device receives an RF signal (e.g., in the case of a signal receive mode), the switch 711_1 may connect the antenna element 741_1 and a first low noise amplifier (LNA) 731_1. Similarly, a switch 711_n may connect an antenna element 741_n and a power amplifier (PA) 721_n or may connect the antenna element 741_n and an n$^{th}$ LNA 731_n.

According to an embodiment, a multiplexer 712 may select an antenna element to be activated in the case of transmitting an RF signal and in the case of receiving an RF signal. For example, when the electronic device (e.g., the electronic device 300b) operates in the first mode, the multiplexer 712 may electrically connect antenna elements included in a first antenna array (e.g., the first antenna array 41 of FIG. 4A) with the RFIC 720. For another example, when the electronic device operates in the second mode, the multiplexer 712 may electrically connect antenna elements included in a second antenna array (e.g., the second antenna array 42) with the RFIC 720.

According to an embodiment, the RFIC 720 may include a transmit path 720_1t and a receive path 720_nr with regard to an RF signal.

According to an embodiment, in the case where the electronic device is in the signal transmit mode, the PA 721_1, a first variable gain amplifier (VGA) 722_1, a phase shifter (PS) 723_1, a second VGA 724_1, a combiner 725, and/or a mixer 726 may be positioned on the transmit path 720_1t of an RF signal. Similarly, in the case of "n" antenna elements (e.g., 741_1 to 741_n) included in the antenna group 741, the RFIC 720 may include an n$^{th}$ PA 721_n, an n$^{th}$ VGA 722_n, an n$^{th}$ PS 723_n, and an n$^{th}$ second VGA 724_n.

The PA 721_1 may amplify a power of the RF signal. According to an embodiment, the PA 721_1 may be mounted inside or outside the RFIC 720. The first VGA 722_1 and the second VGA 724_1 may perform a transmit auto gain control (AGC) operation under control of the communication processor 770. According to an embodiment, the number of variable gain amplifiers may be 2 or more or may be less than 2 The PS 723_1 may change a phase of an RF signal based on a beamforming angle under control of the communication processor 770. The combiner 725 may divide an RF signal from the mixer 726 into "n" signals. The number of the divided signals may be the same as the number of antenna elements (e.g., 741_1 to 741_n) included in the antenna group 741. The mixer 726 may up-convert an IF signal from the IFIC 750 to an RF signal. In an embodiment, the mixer 726 may receive a signal to be mixed from an internal or external oscillator 738.

According to an embodiment, in the case where the electronic device having "n" antenna elements (e.g., 741_1 to 741_n) included in the antenna group 741 is in the signal receive mode, the $n^{th}$ LNA 731_n, an $n^{th}$ PS 732_n, an $n^{th}$ first VGA 733_n, a combiner 734, a second VGA 735, and/or a mixer 736 may be positioned on the receive path 720_nr of the RF signal. Similarly, the RFIC 720 may include the first LNA 731_1, a first PS 732_1, and a first first VGA 733_1 in a receive path.

The LNA 731_n may amplify RF signals received from the antenna elements (e.g., 741_1 to 741_n). The $n^{th}$ first VGA 733_n and the second VGA 735 may perform a receive AGC operation under control of the communication processor 770. According to an embodiment, the number of variable gain amplifiers may be 2 or more or may be less than 2. The $n^{th}$ PS 732_n may change a phase of an RF signal based on a beamforming angle under control of the communication processor 770. The combiner 734 may combine RF signals aligned in phase through a phase shift operation. The combined signal may be provided to the mixer 736 through the second VGA 735. The mixer 736 may down-convert the received RF signal to an IF signal. In an embodiment, the mixer 736 may receive a signal to be mixed from an internal or external oscillator.

According to an embodiment, the RFIC 720 may further include a switch 737 that electrically connects the mixers 726 and 736 and the IFIC 750. The switch 737 may selectively connect the transmit path 720_1t or the receive path 720_nr of the RF signal with the IFIC 750.

According to an embodiment, an oscillator 751, a mixer 753, a third VGA 754_1, a low pass filter (LPF) 755_1, a fourth VGA 756_1, and/or a buffer 757_1 may be positioned on a transmit path 750_t of the IFIC 750. The mixer 753 may convert a balanced in-phase/quadrature-phase (I/Q) signal of a base band to an IF signal. The LPF 755_1 may function as a channel filter that uses a bandwidth of a baseband signal as a cutoff frequency. In an embodiment, the cutoff frequency may be variable. The third VGA 754_1 and the fourth VGA 756_1 may perform a transmit AGC operation under control of the communication processor 770. According to an embodiment, the number of variable gain amplifiers may be 2 or more or may be less than 2 The buffer 757_1 may perform buffering on the balanced I/Q signal received from the communication processor 770, and thus, the IFIC 750 may stably process the balanced I/Q signal. The IFIC 750 may further include a third VGA 754_2, an LPF 755_2, a fourth VGA 756_2, and/or a buffer 757_2.

According to an embodiment, a mixer 761, a third VGA 762_1, an LPF 763_1, a fourth VGA 764_1, and/or a buffer 765_1 may be positioned on a receive path 750_r of the IFIC 750. The functions of the third VGA 762_1, the LPF 763_1, and the fourth VGA 764_1 may be the same as or similar to the functions of the third VGA 754_1, the LPF 755_1, and the fourth VGA 756_1 positioned on the transmit path 750_t. The mixer 761 may convert the IF signal from the first RFIC 720 into a balanced I/Q signal of the baseband. The buffer 765_1 may perform buffering on the balanced I/Q signal passing through the fourth VGA 764_1 when the balanced I/Q signal is provided to the communication processor 770, and thus, the IFIC 750 may stably process the balanced I/Q signal. The IFIC 750 may further include a third VGA 762_2, an LPF 763_2, a fourth VGA 764_2, and/or a buffer 765_2.

According to an embodiment, the communication processor 770 may include a Tx I/Q digital analog converter (DAC) 771 and a Rx I/Q analog digital converter (ADC) 772. In an embodiment, the Tx I/Q DAC 771 may convert a digital signal modulated by a modem into the balanced I/Q signal and may provide the balanced I/Q signal to the IFIC 750. In an embodiment, the Rx I/Q ADC 772 may convert the balanced I/Q signal, which is converted by the IFIC 750, into a digital signal and may provide the digital signal to the modem. According to an embodiment, the communication processor 770 may perform multi input multi output (MIMO) or diversity. According to an embodiment, the communication processor 770 may be implemented with a separate chip or may be implemented in one chip together with any other component (e.g., the IFIC 750).

Figure 8:
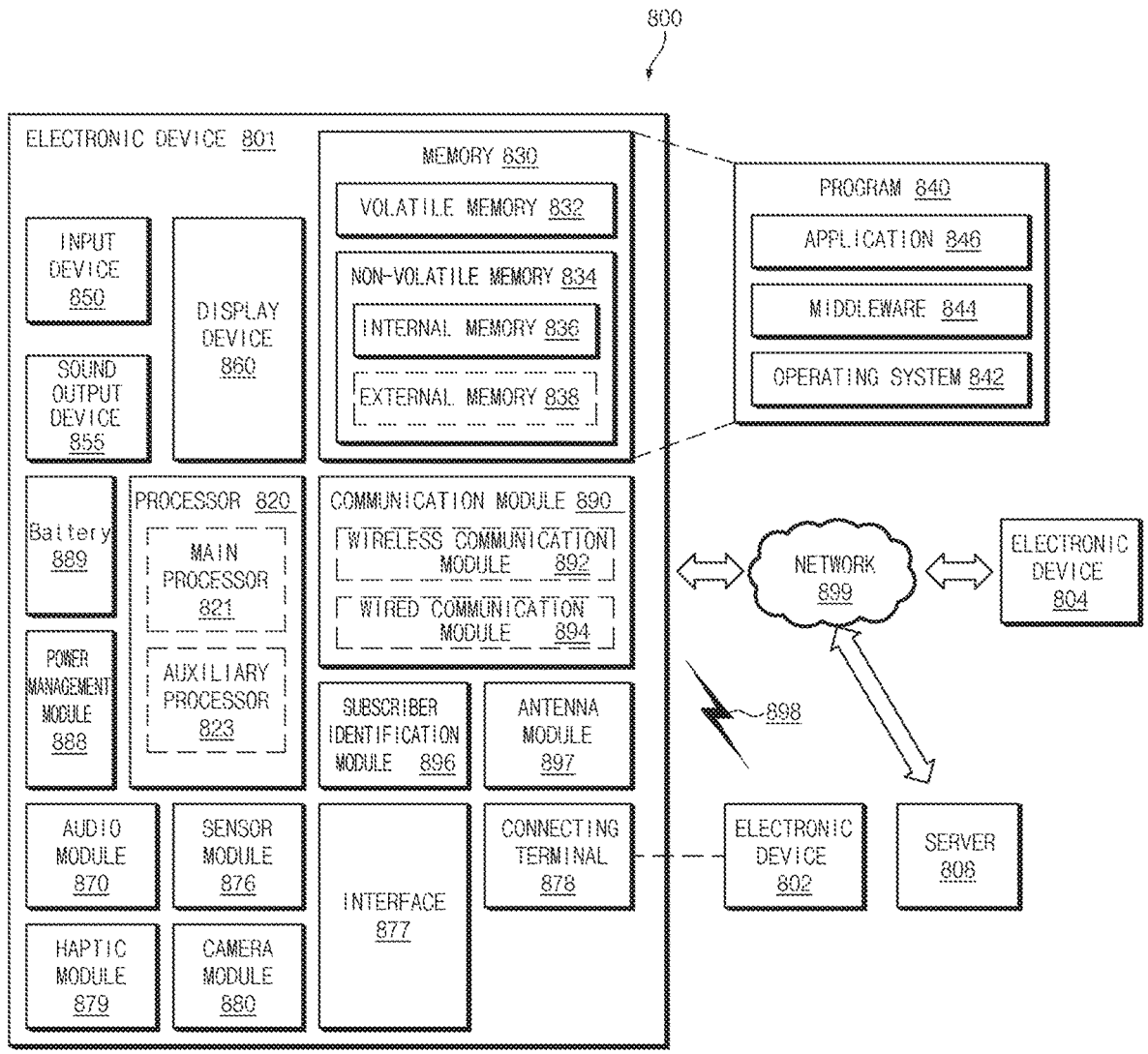
FIG. 8 is a block diagram of an electronic device in a network environment, according to an embodiment of the disclosure.

FIG. 8 is a block diagram illustrating an electronic device in a network environment according to an embodiment of the disclosure.

Referring to FIG. 8, an electronic device 801 in a network environment 800 may communicate with an electronic device 802 via a first network 898 (e.g., a short-range wireless communication network), or an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In an embodiment, at least one (e.g., the display device 860, the camera module 880, or the like) of the components may be omitted from the electronic device 801, or one or more other components may be added in the electronic device 801. In an embodiment, some of the components may be implemented as single integrated circuitry. For example, the sensor module 876 (e.g., a fingerprint sensor, an iris sensor, an illuminance sensor, or the like) may be implemented as embedded in the display device 860 (e.g., a display).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may load a command or data received from another component (e.g., the sensor module 876, the communication module 890, or the like) in a volatile memory 832, process the command or the data stored in the volatile memory 832, and store resulting data in a non-volatile memory 834. According to an embodiment, the processor 820 may include a main processor 821 (e.g., a central processing unit (CPU), an application processor (AP), or the like), and an auxiliary processor 823 (e.g., a graphics processing unit (GPU), an image signal processor (ISP), a sensor hub processor, a communication processor (CP), or the like) that is operable independently from, or in conjunction with, the main processor 821. Additionally or alternatively, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display device 860, the sensor module 876, the communication module 890, or the like) among the components of the electronic device 801, instead of the main processor 821 while the main processor 821 is in an inactive (e.g., sleep)

state, or together with the main processor 821 while the main processor 821 is in an active state (e.g., executing an application). According to an embodiment, the auxiliary processor 823 (e.g., an image signal processor, a communication processor, or the like) may be implemented as part of another component (e.g., the camera module 880, the communication module 890, or the like) functionally related to the auxiliary processor 823.

The memory 830 may store various data used by at least one component (e.g., the processor 820, the sensor module 876, or the like) of the electronic device 801. The various data may include, for example, software (e.g., the program 840) and input data or output data for a command related thererto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by another component (e.g., the processor 820) of the electronic device 801, from the outside (e.g., a user) of the electronic device 801. The input device 850 may include, for example, a microphone, a mouse, a keyboard, or a digital pen (e.g., a stylus pen).

The sound output device 855 may output sound signals to the outside of the electronic device 801. The sound output device 855 may include, for example, a speaker or a receiver. The speaker may be used for general purposes, such as playing multimedia or playing a record, and the receiver may be used for an incoming calls. According to an embodiment, the receiver may be implemented as separate from, or as part of the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or a headphone of an external electronic device (e.g., the electronic device 802) directly (e.g., wired) or wirelessly coupled with the electronic device 801.

The sensor module 876 may detect an operational state (e.g., power, temperature, or the like) of the electronic device 801 or an environmental state (e.g., a state of a user) external to the electronic device 801, and generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, or the like.

The interface 877 may support one or more specified protocols to be used for the electronic device 801 to be coupled with the external electronic device (e.g., the electronic device 802) directly (e.g., wired) or wirelessly. According to an embodiment, the interface 877 may include, for example, a high definition multimedia interface (HDMI), a universal serial bus (USB) interface, a secure digital (SD) card interface, an audio interface, or the like.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector, or the like).

The haptic module 879 may convert an electrical signal into a mechanical stimulus (e.g., a vibration, a movement, or the like) or an electrical stimulus which may be recognized by a user via a tactile sensation or kinesthetic sensation. According to an embodiment, the haptic module 879 may include, for example, a motor, a piezoelectric element, an electric stimulator, or the like.

The camera module 880 may capture a still image or moving images. According to an embodiment, the camera module 880 may include one or more lenses, image sensors, image signal processors, flashes, or the like.

The power management module 888 may manage power supplied to the electronic device 801. According to an embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, a fuel cell, or the like.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that is operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, a global navigation satellite system (GNSS) communication module, or the like) or a wired communication module 894 (e.g., a local area network (LAN) communication module, a power line communication (PLC) module, or the like). A corresponding one of these communication modules may communicate with the external electronic device via the first network 898 (e.g., a short-range communication network, such as Bluetooth™, wireless-fidelity (Wi-Fi) direct, infrared data association (IrDA), or the like) or the second network 899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., PCB). According to an embodiment, the antenna module 897 may include a plurality of antennas. In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

At least some of the above-described components may be coupled mutually and communicate signals (e.g., commands or data) therebetween via an inter-peripheral communication scheme (e.g., a bus, general purpose input and output (GPIO), serial peripheral interface (SPI), mobile industry processor interface (MIPI), or the like).

According to an embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome to the electronic device 801. The electronic device 801 may provide the outcome, with or without further processing of the outcome, as at least part of a reply to the request. To that end, a cloud computing, distributed computing, client-server computing technology, or the like may be used, for example.

Figure 9:
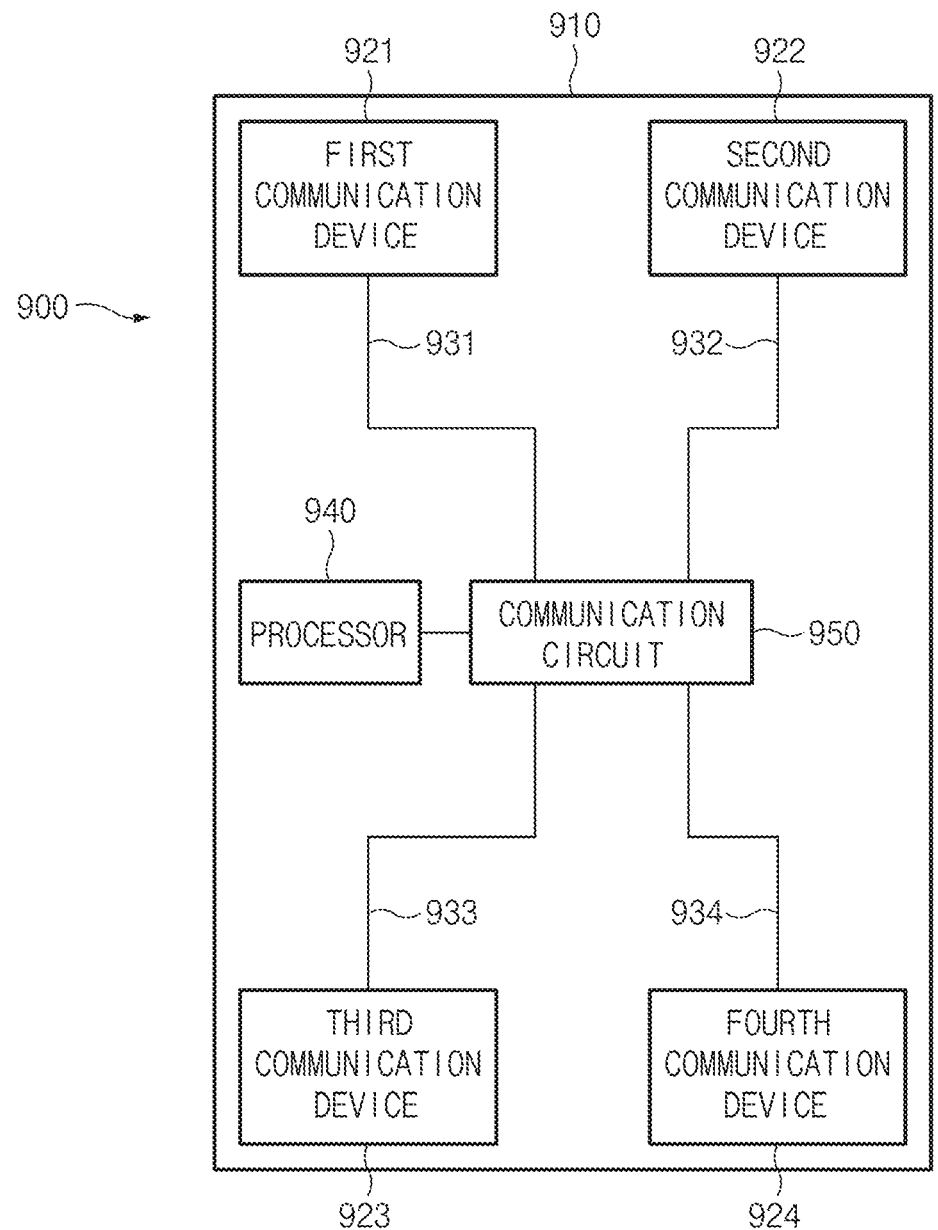
FIG. 9 is a diagram illustrating an example of an electronic device supporting 5G communication according to an embodiment of the disclosure.

FIG. 9 is a diagram illustrating an example of an electronic device supporting 5G communication according to an embodiment of the disclosure.

Referring to FIG. 9, an electronic device 900 (e.g., the electronic device 801 of FIG. 8) may include a housing 910, a processor 940 (e.g., the processor 820 of FIG. 8), a communication circuit 950 (e.g., the communication module 890 of FIG. 8), a first communication device 921, a second communication device 922, a third communication device 923, a fourth communication device 924, a first conductive line 931, a second conductive line 932, a third conductive line 933, or a fourth conductive line 934.

According to an embodiment, the housing 910 may protect other components of the electronic device 900. The housing 910 may include, for example, a front plate, a back plate facing away from the front plate, and a side member (or a metal frame) surrounding a space between the front plate and the back plate. The side member may be attached to the back plate or may be integrally formed with the back plate.

According to an embodiment, the electronic device 900 may include at least one communication device. For example, the electronic device 900 may include at least one of the first communication device 921, the second communication device 922, the third communication device 923, or the fourth communication device 924.

According to an embodiment, the first communication device 921, the second communication device 922, the third communication device 923, or the fourth communication device 924 may be disposed within the housing 910. According to an embodiment, when viewed from above the back plate of the electronic device 900, the first communication device 921 may be disposed at a left top end of the electronic device 900, the second communication device 922 may be disposed at a right top end of the electronic device 900, the third communication device 923 may be disposed at a left bottom end of the electronic device 900, and the fourth communication device 924 may be disposed at a right bottom end of the electronic device 900.

According to an embodiment, the processor 940 may include one or more of a central processing unit, an application processor, a graphic processing unit (GPU), an image signal processor of a camera, a baseband processor (BP) (or a communication processor (CP)), or the like. According to an embodiment, the processor 940 may be implemented with a system on chip (SoC), a system in package (SiP), or the like.

According to an embodiment, the communication circuit 950 may be electrically connected with at least one communication device by using at least one conductive line. For example, the communication circuit 950 may be electrically connected with the first communication device 921, the second communication device 922, the third communication device 923, or the fourth communication device 924 by using the first conductive line 931, the second conductive line 932, the third conductive line 933, or the fourth conductive line 934. The communication circuit 950 may include, for example, a baseband processor or at least one communication circuit (e.g., an IFIC or an RFIC). The communication circuit 950 may include, for example, a baseband processor that is independent of the processor 940 (e.g., an application processor (AP)). The first conductive line 931, the second conductive line 932, the third conductive line 933, or the fourth conductive line 934 may include, for example, a coaxial cable or a flexible printed circuit board (FPCB).

According to an embodiment, the communication circuit 950 may include a first baseband processor (BP) (not illustrated) or a second baseband processor (not illustrated). The electronic device 900 may further include one or more interfaces, which support inter-chip communication, between the first BP (or the second BP) and the processor 940. The processor 940 and the first BP or the second BP may transmit/receive data by using the inter-chip interface (e.g., an inter processor communication channel).

According to an embodiment, the first BP or the second BP may provide an interface for performing communication with any other entities. The first BP may support, for example, wireless communication with regard to a first network (not illustrated). The second BP may support, for example, wireless communication with regard to a second network (not illustrated).

According to an embodiment, the first BP or the second BP may form one module with the processor 940. For example, the first BP or the second BP may be integrated with the processor 940. For another example, the first BP or the second BP may be disposed in one chip or may be implemented in the form of an independent chip. According to an embodiment, the processor 940 and at least one baseband processor (e.g., the first BP) may be integrated in one chip (e.g., a SoC), and another baseband processor (e.g., the second BP) may be implemented in the form of an independent chip.

According to an embodiment, the first network (not illustrated) or the second network (not illustrated) may correspond to the network 899 of FIG. 8. According to an embodiment, the first network (not illustrated) and the second network (not illustrated) may include a $4^{th}$ generation (4G) network and a $5^{th}$ generation (5G) network, respectively. The 4G network may support, for example, a long term evolution (LTE) protocol defined in the 3GPP. The 5G network may support, for example, a new radio (NR) protocol defined in the 3GPP.

Figure 10:
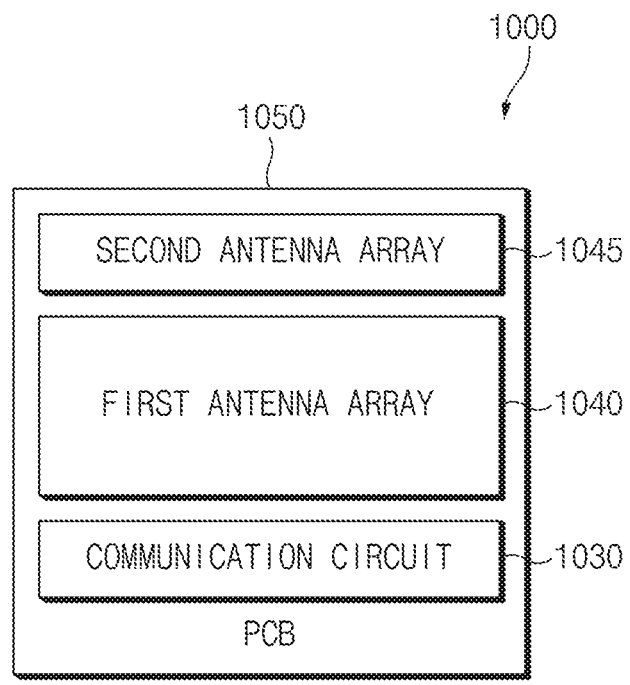
FIG. 10 is a block diagram of a communication device according to an embodiment of the disclosure.

FIG. 10 is a block diagram of a communication device according to an embodiment of the disclosure.

Referring to FIG. 10, a communication device 1000 (e.g., the first communication device 921, the second communication device 922, the third communication device 923, or the fourth communication device 924 of FIG. 9) may include a communication circuit 1030 (e.g., an RFIC), a PCB 1050, a first antenna array 1040, or a second antenna array 1045.

According to an embodiment, the communication circuit 1030, the first antenna array 1040, or the second antenna array 1045 may be disposed on the PCB 1050. For example, the first antenna array 1040 or the second antenna array 1045 may be disposed on a first surface of the PCB 1050, and the communication circuit 1030 may be disposed on a second surface of the PCB 1050. The PCB 1050 may include a connector (e.g., a coaxial cable connector, a board to board (B-to-B) connector, or the like) for electrical connection with any other PCB (e.g., a PCB on which the communication circuit 950 of FIG. 9 is disposed) by using a transmission line (e.g., the first conductive line 931 of FIG. 9 or a coaxial cable). For example, the PCB 1050 may be connected with the PCB, on which the communication circuit 950 is disposed, with a coaxial cable by using the coaxial cable connector, and the coaxial cable may be used to transfer an RF signal or receive and transmit IF signals. For another example, a power or any other control signal may be transferred through the B-to-B connector.

According to an embodiment, the first antenna array 1040 or the second antenna array 1045 may include a plurality of antenna elements. The antenna elements may include a patch antenna, a loop antenna, or a dipole antenna. For example, an antenna element included in the first antenna array 1040 may be a patch antenna for forming a beam toward the back plate of the electronic device 900. For another example, an antenna element included in the second antenna array 1045 may be a dipole antenna or a loop antenna for the purpose of forming a beam toward the side member of the electronic device 900.

According to an embodiment, the communication circuit 1030 may support at least a portion (e.g., 24 GHz to 30 GHz, 37 GHz to 40 GHz, or the like) of a band ranging from 3 GHz to 100 GHz. According to an embodiment, the communication circuit 1030 may up-convert or down-convert a frequency. For example, the communication circuit 1030 included in the communication device 1000 (e.g., the first communication device 921 of FIG. 9) may up-convert an IF signal received from a communication module (e.g., the communication circuit 950 of FIG. 9) through a conductive line (e.g., the first conductive line 931 of FIG. 2A) into an RF signal. For another example, the communication circuit 1030 included in the communication device 1000 (e.g., the first communication device 921 of FIG. 9) may down-convert an RF signal (e.g., a millimeter wave signal) received through the first antenna array 1040 or the second antenna array 1045 into an IF signal and may provide the IF signal to a communication module by using a conductive line.

An electronic device according to an embodiment of the disclosure may include a housing, an antenna structure (e.g., the antenna structure 160 of FIG. 1) that is disposed in the housing, wherein the antenna structure includes a printed circuit board, a first sub antenna structure (e.g., the second sub antenna structure 161 of FIG. 2) including first group antenna elements (e.g., the first group antenna elements 21-1 of FIG. 2) disposed on the printed circuit board, a second sub antenna structure (e.g., the second sub antenna structure 162 of FIG. 2) including second group antenna elements (e.g., the second group antenna elements 21-2 of FIG. 2) disposed on the printed circuit board in a first direction from the first sub antenna structure, a third sub antenna structure (e.g., the third sub antenna structure 163 of FIG. 2) including third group antenna elements (e.g., the third group antenna elements 21-3 of FIG. 2) disposed on the printed circuit board in a second direction perpendicular to the first direction from the first sub antenna structure, and a fourth sub antenna structure (e.g., the fourth sub antenna structure 164 of FIG. 2) including fourth group antenna elements (e.g., the fourth group antenna elements 21-4 of FIG. 2) disposed on the printed circuit board so as to form a two-dimensional array together with at least some antenna elements of the first group antenna elements, at least some antenna elements of the second group antenna elements, or at least some antenna elements of the third group antenna elements, and a communication circuit (e.g., the communication circuit 310*a* of FIG. 3A) that transmits and/or receives a signal having a frequency between 3 GHz and 100 GHz by using at least a part of the first group antenna elements, the second group antenna elements, the third group antenna elements, or the fourth group antenna elements.

According to an embodiment, the communication circuit may transmit or receive the signal by operating in one of a first mode using the first group antenna elements and the second group antenna elements, a second mode using the first group antenna elements and the third group antenna elements, or a third mode using antenna elements forming the two-dimensional array.

In an embodiment, the electronic device may further include at least one processor, and the at least one processor may control the communication circuit such that the communication circuit operates in one mode, in which a communication performance of the electronic device is maintained at a specified level or higher, from among the first mode, the second mode, and the third mode.

In an embodiment, the at least one processor may determine a level of the communication performance of the electronic device while the communication circuit operates in the one mode and may control the communication circuit such that the communication circuit operates in a mode, which is different from the one mode and in which the communication performance is maintained at the specified level or higher, from among the first mode, the second mode, and the third mode, when the communication performance is lower than the specified level.

In an embodiment, the communication performance may be determined based on at least one of a reference signal received power (RSRP), a reference signal received quality (RSRQ), a received signal strength index (RSSI), or a signal noise ratio (SNR).

In an embodiment, the electronic device may further include at least one switch that is electrically connected with the antenna structure and the communication circuit, and the at least one processor may control the at least one switch to electrically connect the first group antenna elements and the second group antenna elements with the communication circuit when the communication circuit operates in the first mode, to electrically connect the first group antenna elements and the third group antenna elements with the communication circuit when the communication circuit operates in the second mode, and to electrically connect antenna elements forming the two-dimensional array with the communication circuit when the communication circuit operates in the third mode.

In an embodiment, the at least one switch may include a first terminal, a second terminal, and a third terminal, the first group antenna elements and the second group antenna elements may be electrically connected with the first terminal, the first group antenna elements and the third group antenna elements may be electrically connected with the second terminal, and antenna elements forming the two-dimensional array may be electrically connected with the third terminal.

In an embodiment, the at least one switch may be designed in one integrated circuit (IC) with the communication circuit. In an embodiment, the at least one switch may be implemented with a multiplexer.

According to an embodiment, at least a part of antenna elements included in the antenna structure may include a patch antenna.

According to an embodiment, at least a part of antenna elements included in the antenna structure may include a dipole antenna.

In an embodiment, the dipole antenna may form a fourth antenna array facing a direction opposite to the first direction and a fifth antenna array facing a direction opposite to the second direction.

In an embodiment, the first sub antenna structure may include a fifth group antenna element forming the fourth antenna array and a sixth group antenna element forming the fifth antenna array.

According to an embodiment, the housing may include a first surface, a second surface facing away from the first surface, and a side member surrounding a space between the first surface and the second surface, and the antenna structure may be disposed in the housing so as to be adjacent to at least a portion of the side member.

In an embodiment, a shape of the side member may be a substantial quadrangle, and the antenna structure may be disposed such that the first sub antenna structure is adjacent to a first corner of the side member.

In an embodiment, the first direction and the second direction are perpendicular to a direction which the first surface faces.

According to an embodiment, the electronic device may further include at least one sensor that senses a posture of the electronic device, and at least one processor that is electrically connected with the at least one sensor, and the at least one processor may control the communication circuit based at least on the posture of the electronic device sensed by the at least one sensor such that the communication circuit operates in one of the first mode, the second mode, and the third mode.

In an embodiment, the at least one sensor may include at least one of a gyro sensor, an acceleration sensor, or a geomagnetic sensor.

According to an embodiment, the electronic device may further include at least one sensor that senses a grip state of a user, and at least one processor that is electrically connected with the at least one sensor, and the at least one processor may obtain information of a location of the electronic device, at which the grip of the user is made, by using the at least one sensor and may control the communication circuit based on the location information such that the communication circuit operates in one of the first mode, the second mode, and the third mode.

In an embodiment, the at least one sensor may include a proximity sensor.

According to various embodiments of the disclosure, an electronic device may maintain a communication performance at a specified level or higher regardless of a posture of the electronic device, a grip type of a user, or a direction of a base station (or an external electronic device). Also, an inner space of the electronic device, which is occupied by an antenna module, may decrease by efficiently arranging antenna elements. As such, the electronic device may be miniaturized and may include any other additional module(s) capable of performing various functions. Accordingly, the user may make use of an electronic device that has a smaller size and more improved performance.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and may include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, an electronic device may maintain a communication performance at a specified level or higher regardless of a posture of the electronic device, a grip type of a user, or a direction of a base station (or an external electronic device). Also, an inner space of the electronic device, which is occupied by an antenna module, may decrease by efficiently arranging antenna elements included in the antenna module. As such, the user may make use of an electronic device that has a smaller size and a more improved performance. Besides, a variety of effects directly or indirectly understood through this disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   an antenna structure disposed in the housing,
   wherein the antenna structure includes:
      a printed circuit board,
      a first sub antenna structure including first group antenna elements disposed on the printed circuit board,
      a second sub antenna structure including second group antenna elements disposed on the printed circuit board in a first direction from the first sub antenna structure, wherein the first sub antenna structure and the second sub antenna structure together form a first antenna array extending in the first direction,
      a third sub antenna structure including third group antenna elements disposed on the printed circuit board in a second direction perpendicular to the first direction from the first sub antenna structure, wherein the first sub antenna structure and the third sub antenna structure together form a second antenna array extending in the second direction, and
      a fourth sub antenna structure including fourth group antenna elements disposed on the printed circuit board so as to form, together with at least some antenna elements of the first group antenna elements, at least some antenna elements of the second group antenna elements, and at least some antenna elements of the third group antenna elements, a third, two-dimensional, antenna array; and
   a communication circuit configured to transmit and/or receive a signal having a frequency between 3 GHz and 100 GHz by using at least a part of the first group antenna elements, the second group antenna elements, the third group antenna elements, or the fourth group antenna elements,
   wherein the communication circuit is further configured to transmit or receive the signal by operating in one of a first mode using the first antenna array, a second mode using the second antenna array, or a third mode using the third, two-dimensional, antenna array.

2. The electronic device of claim 1, further comprising:
   at least one processor,
   wherein the at least one processor is configured to control the communication circuit such that the communication circuit operates in one mode, in which a communication performance of the electronic device is maintained at a specified level or higher, from among the first mode, the second mode, and the third mode.

3. The electronic device of claim 2, wherein the at least one processor is further configured to:
   determine a level of the communication performance of the electronic device while the communication circuit operates in the one mode, and
   control the communication circuit such that the communication circuit operates in a mode, which is different from the one mode and in which the communication performance is maintained at the specified level or higher, from among the first mode, the second mode, and the third mode, when the communication performance is lower than the specified level.

4. The electronic device of claim 2, wherein the communication performance is determined based on at least one of a reference signal received power (RSRP), a reference signal received quality (RSRQ), a received signal strength index (RSSI), or a signal noise ratio (SNR).

5. The electronic device of claim 2, further comprising:
at least one switch electrically connected with the antenna structure and the communication circuit,
wherein the at least one processor controls the at least one switch to electrically connect the first group antenna elements and the second group antenna elements forming the first antenna array with the communication circuit when the communication circuit operates in the first mode, to electrically connect the first group antenna elements and the third group antenna elements forming the second antenna array with the communication circuit when the communication circuit operates in the second mode, and to electrically connect antenna elements forming the third, two-dimensional, antenna array with the communication circuit when the communication circuit operates in the third mode.

6. The electronic device of claim 5,
wherein the at least one switch includes a first terminal, a second terminal, and a third terminal,
wherein the first group antenna elements and the second group antenna elements forming the first antenna array are electrically connected with the first terminal,
wherein the first group antenna elements and the third group antenna elements forming the second antenna array are electrically connected with the second terminal, and
wherein antenna elements forming the third, two-dimensional, antenna array are electrically connected with the third terminal.

7. The electronic device of claim 5, wherein the at least one switch is designed in one integrated circuit (IC) with the communication circuit.

8. The electronic device of claim 5, wherein the at least one switch is implemented with a multiplexer.

9. The electronic device of claim 1, wherein at least a part of antenna elements included in the antenna structure includes a patch antenna.

10. The electronic device of claim 1, wherein at least a part of antenna elements included in the antenna structure includes a dipole antenna.

11. The electronic device of claim 10, wherein the dipole antenna forms a fourth antenna array facing a direction opposite to the first direction and a fifth antenna array facing a direction opposite to the second direction.

12. The electronic device of claim 11, wherein the first sub antenna structure includes a fifth group antenna element forming the fourth antenna array and a sixth group antenna element forming the fifth antenna array.

13. The electronic device of claim 1,
wherein the housing includes a first surface, a second surface facing away from the first surface, and a side member surrounding a space between the first surface and the second surface, and
wherein the antenna structure is disposed in the housing so as to be adjacent to at least a portion of the side member.

14. The electronic device of claim 13,
wherein a shape of the side member is a substantial quadrangle, and
wherein the antenna structure is disposed such that the first sub antenna structure is adjacent to a first corner of the side member.

15. The electronic device of claim 13, wherein the first direction and the second direction are perpendicular to a direction which the first surface faces.

16. The electronic device of claim 1, further comprising:
at least one sensor configured to sense a posture of the electronic device; and
at least one processor electrically connected with the at least one sensor,
wherein the at least one processor is configured to:
control the communication circuit based at least on the posture of the electronic device sensed by the at least one sensor such that the communication circuit operates in one of the first mode, the second mode, or the third mode.

17. The electronic device of claim 16, wherein the at least one sensor includes at least one of a gyro sensor, an acceleration sensor, or a geomagnetic sensor.

18. The electronic device of claim 1, further comprising:
at least one sensor configured to sense a grip state of a user; and
at least one processor electrically connected with the at least one sensor,
wherein the at least one processor is configured to:
obtain information of a location of the electronic device, at which the grip of the user is made, by using the at least one sensor, and
control the communication circuit based on the location information such that the communication circuit operates in one of the first mode, the second mode, or the third mode.

19. The electronic device of claim 18, wherein the at least one sensor includes a proximity sensor.

* * * * *